United States Patent
Chae et al.

(10) Patent No.: US 10,325,477 B2
(45) Date of Patent: Jun. 18, 2019

(54) METHOD OF PROVIDING ACTIVITY NOTIFICATION AND DEVICE THEREOF

(71) Applicant: SAMSUNG ELECTRONICS CO., LTD., Suwon-si, Gyeonggi-do (KR)

(72) Inventors: Han-joo Chae, Seoul (KR); Hyun-soo Nah, Seoul (KR); Jong-hyun Ryu, Daejeon (KR); Sang-ok Cha, Suwon-si (KR); Seung-eok Choi, Suwon-si (KR); Won-young Choi, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/952,067

(22) Filed: Apr. 12, 2018

(65) Prior Publication Data
US 2018/0233023 A1 Aug. 16, 2018

Related U.S. Application Data

(63) Continuation of application No. 15/673,117, filed on Aug. 9, 2017, now Pat. No. 10,055,970, which is a (Continued)

(30) Foreign Application Priority Data

Mar. 24, 2014 (KR) ........................ 10-2014-0034129

(51) Int. Cl.
*G08B 21/24* (2006.01)
*G06Q 10/06* (2012.01)
(Continued)

(52) U.S. Cl.
CPC ......... *G08B 21/24* (2013.01); *G06F 16/3344* (2019.01); *G06Q 10/063116* (2013.01);
(Continued)

(58) Field of Classification Search
CPC .......... G08B 21/24; G06Q 10/063116; G06Q 10/1093; H04L 63/0876; H04L 65/1023; H04L 67/306
(Continued)

(56) References Cited

U.S. PATENT DOCUMENTS 6,571,279 B1 5/2003 Herz et al.
6,594,654 B1 * 7/2003 Salam ............... G06F 17/30861
(Continued)

FOREIGN PATENT DOCUMENTS

CN 103297320 9/2013
CN 103516780 1/2014
(Continued)

OTHER PUBLICATIONS

Extended European Search Report issued in Appln. No. 15769011.6 dated Aug. 4, 2017.
(Continued)

*Primary Examiner* — John A Tweel, Jr.
(74) *Attorney, Agent, or Firm* — Nixon & Vanderhye, P.C.

(57) ABSTRACT

A method of providing an activity notification is provided. The method includes registering, by the device, information about the activity notification according to a request for registering the activity notification, and transmitting, by the device, the registered information about the activity notification to a management device, wherein the management device performs a process of providing the activity notification.

20 Claims, 26 Drawing Sheets

Related U.S. Application Data continuation of application No. 15/592,605, filed on May 11, 2017, now Pat. No. 10,068,458, which is a continuation of application No. 14/666,981, filed on Mar. 24, 2015, now Pat. No. 9,672,483.

(51) Int. Cl.
  *G06Q 10/10* (2012.01)
  *G06F 16/33* (2019.01)
  *H04L 29/08* (2006.01)
  *H04L 29/06* (2006.01)

(52) U.S. Cl.
  CPC ..... *G06Q 10/1093* (2013.01); *G06Q 10/1097* (2013.01); *H04L 65/1023* (2013.01); *H04L 67/306* (2013.01); *H05K 999/99* (2013.01)

(58) Field of Classification Search
  USPC .................................................... 340/539.11
  See application file for complete search history.

(56) References Cited

U.S. PATENT DOCUMENTS

| | | | |
|---|---|---|---|
| 6,631,363 B1 | 10/2003 | Brown et al. | |
| 6,868,441 B2 | 3/2005 | Greene et al. | |
| 7,224,957 B2 | 5/2007 | Spector | |
| 7,499,982 B2* | 3/2009 | Yoshimine | H04L 67/42 709/203 |
| 7,583,972 B2 | 9/2009 | Clipsham | |
| 7,630,986 B1 | 12/2009 | Herz et al. | |
| 8,516,529 B2* | 8/2013 | Lajoie | H04L 65/1016 709/201 |
| 9,144,381 B2 | 9/2015 | Rosen | |
| 9,300,744 B2 | 3/2016 | Perotti | |
| 9,569,587 B2* | 2/2017 | Ansari | H04L 63/08 |
| 9,672,483 B2 | 6/2017 | Chae et al. | |
| 2004/0207522 A1 | 10/2004 | McGee et al. | |
| 2007/0133756 A1 | 6/2007 | Graves, III et al. | |
| 2007/0179355 A1 | 8/2007 | Rosen | |
| 2011/0166963 A1 | 7/2011 | Vatti | |
| 2011/0231493 A1 | 9/2011 | Dyor | |
| 2012/0079024 A1 | 3/2012 | Tse et al. | |
| 2012/0221731 A1 | 8/2012 | Li et al. | |
| 2013/0031169 A1 | 1/2013 | Axelrod et al. | |
| 2013/0316313 A1 | 11/2013 | Darrow | |
| 2013/0346546 A1 | 12/2013 | Jung | |
| 2014/0033071 A1 | 1/2014 | Gruber et al. | |
| 2017/0083179 A1 | 3/2017 | Gruber et al. | |
| 2017/0249828 A1 | 8/2017 | Chae et al. | |
| 2017/0365156 A1 | 12/2017 | Chae et al. | |

FOREIGN PATENT DOCUMENTS

| | | |
|---|---|---|
| EP | 2 587 746 | 5/2013 |
| KR | 10-0989243 | 10/2010 |
| WO | 2013/173511 | 11/2013 |

OTHER PUBLICATIONS

Chae et al., U.S. Appl. No. 15/592,605, filed May 11, 2017.
Chae et al., U.S. Appl. No. 15/673,117, filed Aug. 9, 2017.
Office Action dated Jan. 30, 2019 in counterpart Chinese Patent Application No. 201580015816.4 and English-language translation.

* cited by examiner

FIG. 2

| PROCESS \ EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| REGISTERING ACTIVITY NOTIFICATION | D1 (Me) | D1 (Me) | D1 (Me) | D1 (Me) | D1 (Me) | D1 (Me) | D1 (Me) | D1 (Me) |
| EDITING OR CANCELING ACTIVITY NOTIFICATION | D1 (Me) | D1 (Me) | D1 (Me) | D2 (other) | D1 (Me) | SP (D2) | D2 (other) | SP |
| CHECKING ACTIVITY NOTIFICATION TRIGGERING CONDITION | D1 (Me) | D1 (Me) | D2 (other) | D2 (other) | SP | SP (D2) | SP | SP |
| TRIGGERING ACTIVITY NOTIFICATION | D1 (Me) | D2 (other) | D2 (other) | D2 (other) | D2 (other) | D1 (Me) | D1 (Me) | D2 (other) |

SP : Service Provider
D : Device

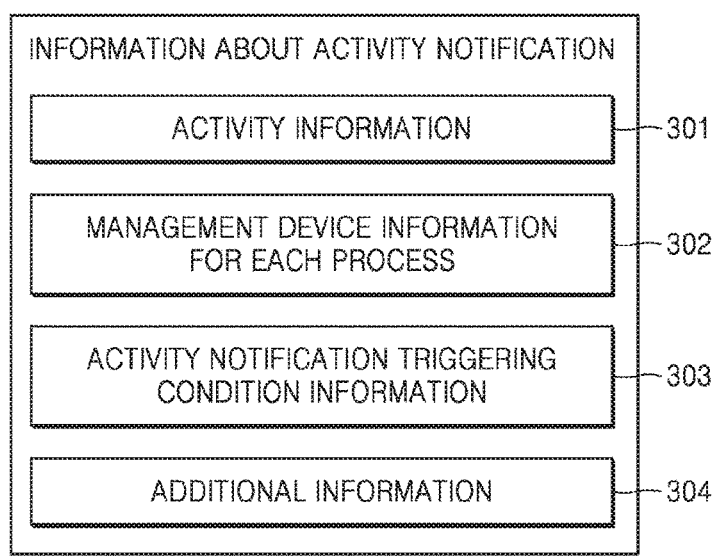

FIG. 3

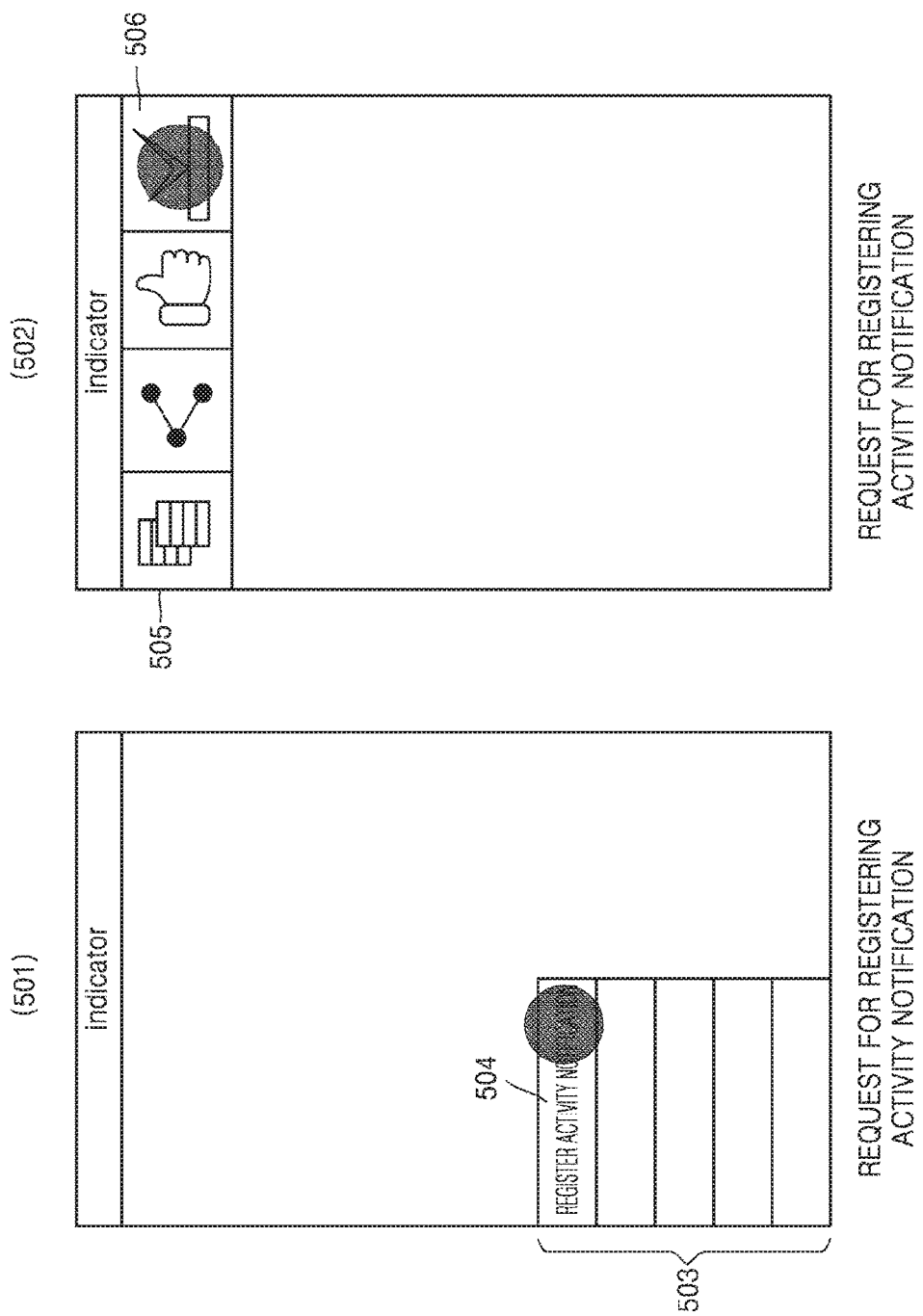

REGISTERING
ACTIVITY NOTIFICATION (403)

FIG. 7
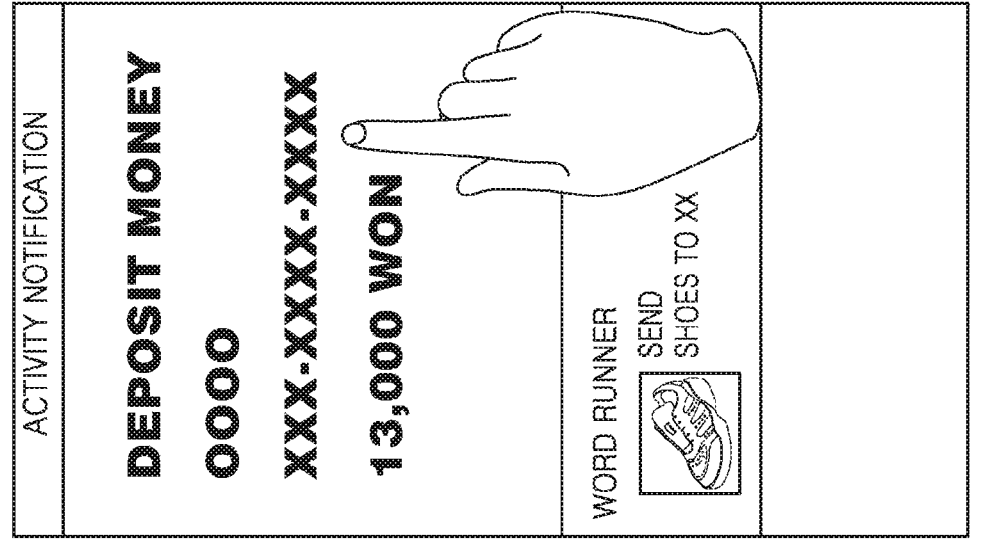
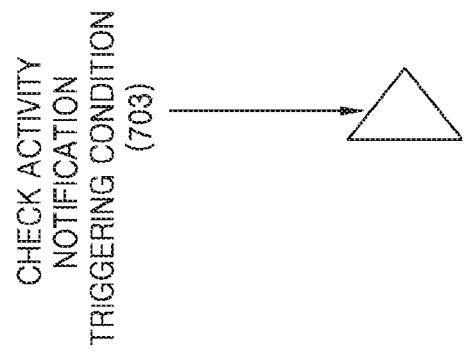
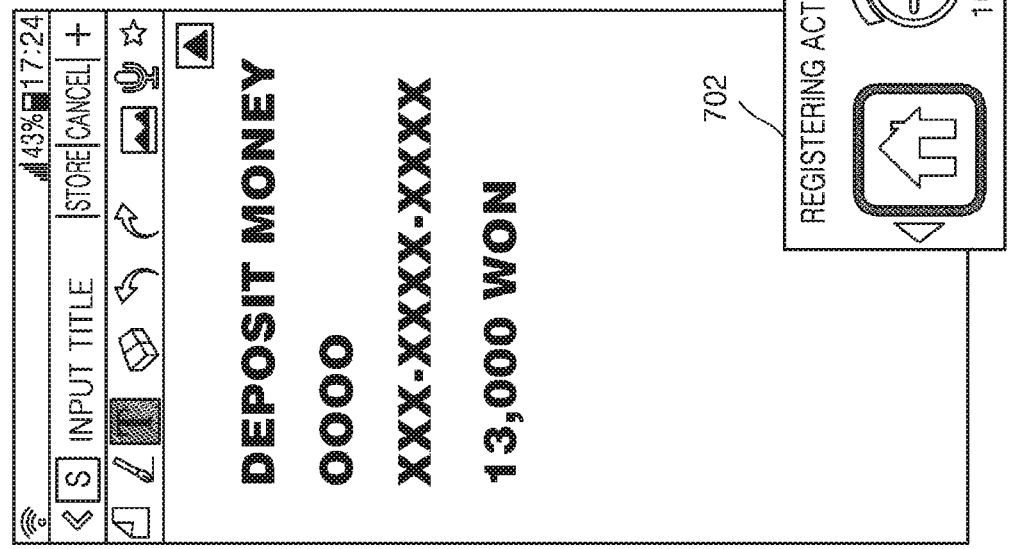

| PROCESS \ EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| REGISTERING ACTIVITY NOTIFICATION | SP | SP | SP | SP | SP | SP | SP | SP |
| EDITING OR CANCELING ACTIVITY NOTIFICATION | SP | SP | SP | SP | SP | D1 (Me) | D1 (Me) | D2 (other) |
| CHECKING ACTIVITY NOTIFICATION TRIGGERING CONDITION | SP | SP | D1 (Me) | D1 (Me) | D2 (other) | D1 (Me) | D2 (other) | D2 (other) |
| TRIGGERING ACTIVITY NOTIFICATION | D1 (Me) | D2 (other) | D1 (Me) | D2 (other) | D1 (Me) | D1 (Me) | D2 (other) | D2 (other) |

SP : Service Provider
D : Device

FIG. 19

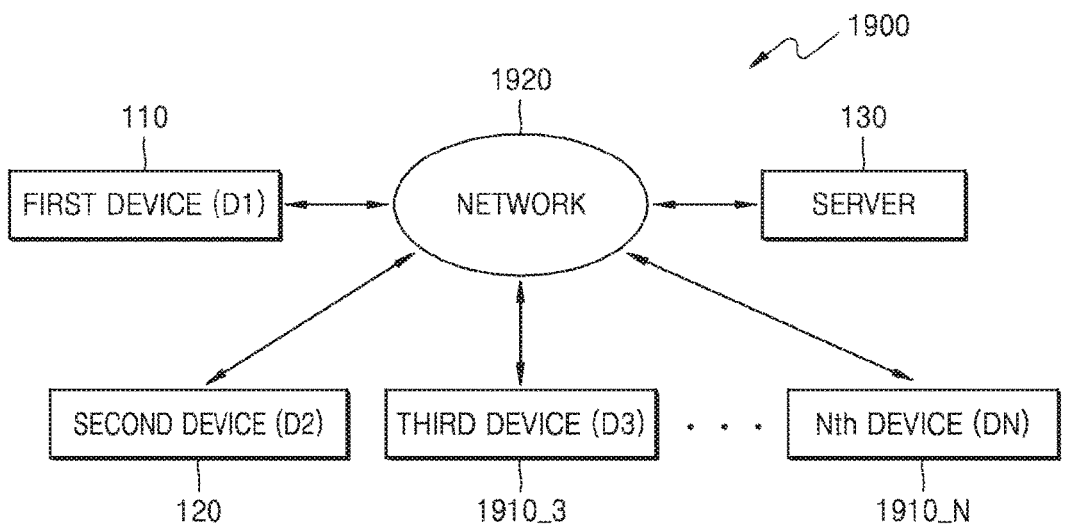

FIG. 20

| EXAMPLE / PROCESS | EXAMPLE 1 | EXAMPLE 2 | EXAMPLE 3 | EXAMPLE 4 | EXAMPLE 5 |
|---|---|---|---|---|---|
| REGISTERING ACTIVITY NOTIFICATION | D1 (Me) | D1 (Me) | D1 (Me) | D1 (Me) | D1 (Me) |
| EDITING OR CANCELING ACTIVITY NOTIFICATION | D1 (Me) | D2 (other) | D2 (other) | D2 (other) | SP |
| CHECKING ACTIVITY NOTIFICATION TRIGGERING CONDITION | D2 (other) | D2 (other) | D3 (other) | D3 (other) | SP |
| TRIGGERING ACTIVITY NOTIFICATION | D3 (other) | D3 (other) | D3 (other) | DN (other) | D2~DN (other) |

SP : Service Provider
D : Device

METHOD OF PROVIDING ACTIVITY NOTIFICATION AND DEVICE THEREOF

CROSS-REFERENCE TO RELATED APPLICATION(S)

This application is a continuation of application Ser. No. 15/673,117, filed on Aug. 9, 2017, which is a continuation of application Ser. No. 15/592,605, filed on May 11, 2017, which is a continuation of application Ser. No. 14/666,981, filed on Mar. 24, 2015, now U.S. Pat. No. 9,672,483, which claims the benefit under 35 U.S.C § 119(a) of a Korean patent application filed on Mar. 24, 2014 in the Korean Intellectual Property Office and assigned Serial number 10-2014-0034129. The entire contents of each of these applications are hereby incorporated by reference.

TECHNICAL FIELD

The present disclosure relates to notifications. More particularly, the present disclosure relates to methods of providing an activity notification according to context and a device for performing the method.

BACKGROUND

As communication technology has developed and mobile devices, such as smartphones, wearable devices, and automobiles, which are part of Internet of Things (IoT) networks, become smart, there is a demand for smart notifications according to the diverse lifestyles of people.

In particular, a technique of easily notifying a person and/or others of activities according to context is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of providing an activity notification for notifying a person and/or others of an activity according to context, a device for performing the method, and a recording medium for storing program instructions that can be executed to perform the method.

Another aspect of the present disclosure is to provide a method of providing an activity notification, in which a manager for a process of providing an activity notification, according to context, to a person and/or others may be set, a device for performing the method, and a recording medium for storing program instructions that can be executed to perform the method.

Additional aspects will be set forth in part in the description which follows and, in part, will be apparent from the description, or may be learned by practice of the various embodiments of the present disclosure.

In accordance with an aspect of the present disclosure, a method of providing an activity notification, performed by a device is provided. The method includes registering, by the device, information about the activity notification according to a request for registering the activity notification, and transmitting, by the device, the registered information about the activity notification to a management device, wherein the management device performs a process of providing the activity notification.

In accordance with another aspect of the present disclosure, a device is provided. The device includes an information input unit configured to input information about a request for registering an activity notification and information about the activity notification, a display unit configured to display information based on a user interface via which the request for registering the activity notification and information about the activity notification are input, a storage unit configured to store information about the activity notification received via the information input unit and a program for providing information about the activity notification by using the device, a communication unit configured to communicate with at least one external device, and a processor configured to register, to the storage unit, information about the activity notification received via the information input unit after the request for registering the activity notification is received, and transmit the registered information about the activity notification to the external device via the communication unit, wherein an external device to which the registered information about the activity notification is transmitted is a management device that performs a process of providing the activity notification.

In accordance with another aspect of the present disclosure, a computer readable recording medium is provided. The computer readable recording medium has embodied thereon a program for executing the method of providing the activity notification described above.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 illustrates examples of a management device set with respect to a process of providing an activity notification according to an embodiment of the present disclosure;

FIG. 3 is a configuration example of information about an activity notification according to an embodiment of the present disclosure;

FIG. 5A illustrates user interface information about a request for registering an activity notification according to an embodiment of the present disclosure;

FIGS. 6, 7, 8, 9, 10, 11, and 12 are examples of providing activity notification according to various embodiments of the present disclosure;

FIGS. 13A and 13B illustrate examples of triggering of a plurality of activity notifications according to various embodiments of the present disclosure;

FIG. 17 illustrates other examples of a management device set with respect to a process of providing an activity notification according to an embodiment of the present disclosure;

FIG. 19 is a structural diagram of an activity notification providing system according to an embodiment of the present disclosure;

FIG. 20 illustrates other examples of a management device set with respect to a process of providing an activity notification according to an embodiment of the present disclosure;

Throughout the drawings, it should be noted that like reference numbers are used to depict the same or similar elements, features, and structures.

DETAILED DESCRIPTION

Figure 1:
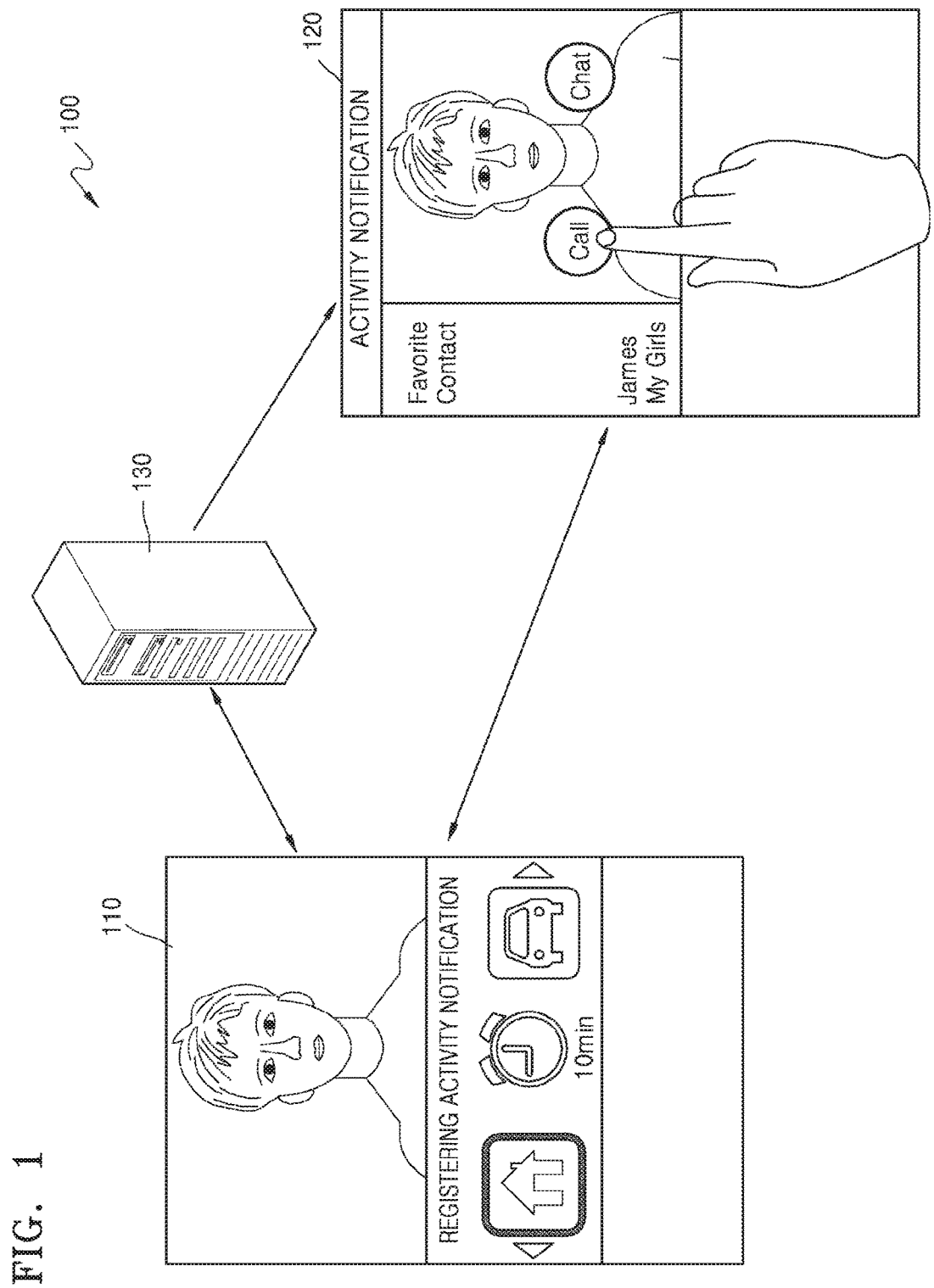
FIG. 1 is a structural diagram of an activity notification providing system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "and/or" includes any and all combinations of one or more of the associated listed items. Expressions such as "at least one of," when preceding a list of elements, modify the entire list of elements and do not modify the individual elements of the list.

While such terms as "first," "second," etc., may be used to describe various components, such components must not be limited to the above terms. The above terms are used only to distinguish one component from another.

The terms used in the present specification are merely used to describe particular embodiments of the present disclosure, and are not intended to limit the present disclosure. The terms used in this specification are those general terms currently widely used in the art in consideration of functions in regard to the present disclosure, but the terms may vary according to the intention of those of ordinary skill in the art, precedents, or new technology in the art. Also, specified terms may be selected by the applicant, and in this case, the detailed meaning thereof will be described in the detailed description of the present disclosure. Thus, the terms used in the specification should be understood not as simple names but based on the meaning of the terms and the overall description of the present disclosure.

In the present specification, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Throughout the specification, an 'activity' may be defined according to context. An activity may include an activity that may be performed using a device and an activity that may be performed without using a device.

The activity that may be performed using the device may include an activity that may be performed using an application or a service set in the device. Examples of the activity that may be performed using the device include making a call, watching a movie, listening to music, viewing pictures, watching news, sending an email, sending a message, online shopping, and Internet searching, but are not limited thereto. Watching a movie, listening to music, viewing pictures, or watching news described above may be referred to as the activity that may be performed without using a device according to context.

Examples of the activity that may be performed without using a device include off-line shopping, getting medical treatment, making a visit, giving someone a bath, feeding an animal, and doing household chores, but are not limited thereto. Getting medical treatment or feeding an animal described above may be referred to as the activity that may be performed using a device according to an application installed in a device or a network service.

Throughout the specification, the term 'context' may indicate a context in which an 'activity' is to be notified to a person and/or others. That is, the term 'context' herein may indicate a context in which an activity notification may be triggered. A context may be set based on at least one of information about a position of a device, information about a surrounding environment of a device, information about a device state, information about time, and information about a person, but is not limited thereto. A context may be set when information about an activity notification is registered, but is not limited thereto.

A set context may be recognized by a device or by external device connected to the device. The external device may include a device having a right to recognize a context set based on the device or a server that is capable of providing an activity notification service according to various embodiments of the present disclosure, but is not limited thereto.

Examples of information about a position of a device, used to set and recognize a context, may include one of information about a physical position of the device and information about a logical position of the device. Information about the physical position of the device may include latitude and longitude information that may be detected using a position sensor included in the device. For example, the position sensor may include a global positioning system (GPS), a gyro sensor, an accelerometer, or an altitude sensor, but is not limited thereto. Information about the logical position of the device may include information indicating a meaning to areas based on physical position information of the device. For example, information about the logical position of the device may include information indicating a meaning, such as a home, an office, a room, a car, a meeting room, or a supermarket, but is not limited thereto. Information about the logical position of the device may have different meanings according to a user. For example, information about the logical position of the device may include information indicating a meaning that is known only to a user of the device.

Examples of information about a surrounding environment of a device, used to set and recognize a context, may include, without limitation, at least one piece of environment information that may be detected using, for example, a sound sensor, a chemical sensor, e.g., an odorant sensor, a temperature sensor, a moisture sensor, an atmospheric pressure sensor, a fine dust sensor, an ultraviolet sensor, an ozone sensor, a carbon dioxide ($CO_2$) sensor, an optical sensor, a proximity sensor, and a network sensor, e.g., a network based on Wi-Fi, Bluetooth, third generation (3G), long term evolution (LTE), or near field communication (NFC), included in a device. For example, a chemical sensor, a temperature sensor, a moisture sensor, an atmospheric pressure sensor, a fine dust sensor, an ultraviolet sensor, an ozone sensor, and a $CO_2$ sensor or the like may be installed outside a device and used by an external device that is outside the device to recognize a surrounding environment of the device.

Examples of information about a device state, used to set and recognize a context, may include, without limitation, at least one piece of information about a device state that is detected using, for example, a pressure sensor, e.g., a touch sensor, a piezoelectric sensor, or physical button, a proximity sensor, a state sensor, e.g., an earphone terminal, a digital multimedia broadcasting (DMB) antenna, a standard terminal, such as a terminal capable of recognizing whether charging is conducted, a terminal capable of recognizing whether the device is connected to a personal computer (PC), or a terminal capable of recognizing whether the device is connected to a dock, or the like, information about a state of a memory included in a device, information about a state of a battery of a device, information about a screen state of a device, and information about an arrangement state of applications of a device.

Examples of information about time, used to set and recognize a context, may include, without limitation, at least one piece of information about chronos-based date and time, e.g., a current time or a predetermined time in the future, and information about kairos-based date and time, e.g., anniversary, morning, afternoon, night, holiday, or legal holiday, national holiday, commuting time, or time spent going to or from school. A context set using information about chronos-based date and time may be recognized using a time sensor included in a device, but is not limited thereto.

Examples of information about a person, used to set and recognize a context, may include, without limitation, at least one piece of health information of a user of a device obtained by using a health sensor, e.g., a biosensor, a heart rate sensor, a blood flow measurement sensor, a glucose sensor for monitoring diabetes, a blood pressure sensor, a stress sensor, or an emotion sensor, included in the device, profile information of a user of a device, e.g., name, age, gender, birthday, address, or phone number, information stored in a phone book of a device, e.g., a name of an acquaintance, a picture of an acquaintance, a phone number of an acquaintance, a birthday of an acquaintance, an address of an acquaintance, an email address of an acquaintance, or a social feed of an acquaintance, wish list information of a user of a device, use record information of a user of a device, e.g., log information, personal information management system (PIMS) information, or memo information, and activity information of a user of a device, e.g., watching an image, listening to music, or sending an email.

Examples of information about an activity notification throughout the specification may include, without limitation, at least one piece of activity information indicating an activity to be notified to a person and/or others, information about a management device managing a process of providing information about an activity notification, information about an activity notification triggering condition, and additional information. Information about an activity notification will be described in more detail later with reference to FIG. 3.

Hereinafter, various embodiments of the present disclosure will be described below in more detail with reference to the accompanying drawings. Those components that are the same or are in correspondence are rendered the same reference numeral, and redundant explanations are omitted.

FIG. 1 is a structural diagram of an activity notification providing system according to an embodiment of the present disclosure.

Referring to FIG. 1, the structural diagram may be referred to as a relation diagram between devices for explaining a method of providing an activity notification according to an embodiment of the present disclosure. An activity notification providing system 100 illustrated in FIG. 1 includes a first device 110, a second device 120, and a server 130.

The first device 110 may include at least one of a portable device, a wearable device, a home internet appliance, and a mobile device, but is not limited thereto.

The portable device, according to an embodiment of the present disclosure, may include at least one of a smartphone, a notebook, a smart board, a tablet PC, a handheld device, a handheld computer, a media player, an electronic book device, and a personal digital assistant (PDA), but is not limited thereto.

The wearable device, according to an embodiment of the present disclosure, may include at least one device that may be used as glasses, a watch, a band, e.g., a waist band or a hair band, various accessories, e.g., a ring, a bracelet, an anklet, a hair pin, or a necklace, and various body protection pads, e.g., a knee pad or elbow pads, shoes, gloves, clothes, a hat, an artificial leg, and an artificial arm, but is not limited thereto.

The home internet appliance, according to an embodiment of the present disclosure, may include at least one home device that are part of machine to machine (M2M) or Internet of things (IoT) networks such as a smart television (TV), a PC, desk top PC, a refrigerator, a washing machine, or lighting devices, but is not limited thereto.

The mobile device, according to an embodiment of the present disclosure, may include at least one device such as an automobile that is part of an M2M or an IoT network, but is not limited thereto.

The second device 120 may include at least one device among the examples of the first device 110 described above. The second device 120 may be a device of another user who is different from a user of the first device 110. The second device 120 may be a device of the same user as the user of the first device 110.

The server 130 may include at least one of a service provider capable of providing an activity notification service, a public cloud server capable of providing an activity notification service, and a private cloud server capable of providing an activity notification service, according to an embodiment of the present disclosure, but is not limited thereto.

FIG. 2 illustrates examples of management devices set with respect to a process of providing an activity notification according to an embodiment of the present disclosure.

Referring to FIG. 2, management devices set by the first device 110 are shown. "D1" of FIG. 2 denotes the first device 110 of FIG. 1, "D2" denotes the second device 120 of FIG. 1, "SP" denotes the server 130 of FIG. 1. A label "me", as shown in FIG. 2, may denote the user of the first device 110, and "other" denotes other users who are different from the user of the first device 110.

A management device manages a process of providing an activity notification according to various embodiments of the present disclosure. A management device may be referred to as a controller that controls, or a manager that manages, a process of providing an activity notification according to various embodiments of the present disclosure. A management device may be set based on at least one piece of information about a person and information about a device. Example 1 through Example 8 of FIG. 2 relate to management devices that are set based on at least one piece of information about a person related to the first device 110, information about the first device 110, and information about an external device of the first device 110.

Information about a person related to the first device 110 may include, without limitation, at least one piece of information indicating a user of the first device 110, e.g., "me", and information indicating a person registered to the first device 110, e.g., names of persons registered to a phone book of the first device 110.

Information about the first device 110 may include, without limitation, information indicating the first device 110, e.g., my phone.

Information about an external device of the first device 110 may include information indicating a device that is connectable to the first device 110. Referring to FIG. 1, information about an external device may include information indicating at least one of the second device 120 and the server 130. Information indicating the second device 120 may include, without limitation, a name of a home internet appliance of the user of the first device 110, e.g., a smart TV or a refrigerator. Information indicating the server 130 may include, without limitation, at least one piece of site information, information about available services, and information about available applications.

Referring to FIG. 2, a process of providing an activity notification according to an embodiment of the present disclosure includes, without limitation, a process of registering information about an activity notification, hereinafter abbreviated as an activity notification registering process, a process of editing or canceling information about an activity notification, hereinafter abbreviated as an activity notification editing or canceling process, a process of checking an activity notification triggering condition, and a process of triggering an activity notification. For example, a process of providing an activity notification may include a process of registering an activity notification, a process of checking an activity notification triggering condition, and a process of triggering an activity notification.

In a process of registering an activity notification, information about an activity notification based on the contexts defined earlier above is registered. The registered information about the activity notification may be configured as illustrated in FIG. 3, but is not limited thereto.

FIG. 3 is a configuration example of information about an activity notification according to an embodiment of the present disclosure.

Referring to FIG. 3, information about an activity notification may include activity information 301, management device information for each process 302, activity notification triggering condition information 303, and additional information 304. The Information about the activity notification may be referred to as an activity message.

The activity information 301 may be input by the user of the first device 110 or generated by the first device 110.

The activity information 301 generated by the first device 110 may be determined according to an application or a service that is being executed by the first device 110 when information about an activity notification is registered, but is not limited thereto. For example, the first device 110 may generate "MAKE CONTACT" as the activity information 301 according to a request for registering an activity notification with respect to a missing and/or missed call related to the user of the first device 110.

To generate the activity information 301 by the first device 110, an activity that may be performed by the first device 110 and activity information corresponding to the activity may be mapped in advance. Information obtained by mapping the activity and the activity information may be stored in the first device 110 to be used, but is not limited thereto. For example, information obtained by mapping the activity and the activity information may be stored in an external device of the first device 110 to be used. The activity information 301 may include at least one of text information, still image information, video information, audio information, application link information, service link information, application function information, and service function information, but is not limited thereto.

The management device information for each process 302 may include information about management devices set regarding respective processes as illustrated in FIG. 2. The management device information for each process 302 may include at least one of an identification code of a management device, connection channel information of a management device, e.g., port 1 or port 2, a management device name, position information of a management device such as a uniform resource locator (URL) or a uniform resource identifier (URI), and information about a user of a management device, but is not limited thereto. Information about a user of a management device may include information indicating the user of the first device 110, e.g., "me" or the name of the user, or information indicating an acquaintance of the user of the first device 110, e.g., the name of an acquaintances of the user of the first device 110, but is not limited thereto.

The activity notification triggering condition information 303 may include information whereby a context in which an activity notification may be triggered may be recognized. For example, if information about an activity notification regarding a missed call related to the user of the first device 110 is "contact when at home," the activity notification triggering condition information 303 may include information whereby a context in which position information of the first device 110 is home is recognized, physical position information of home. The activity notification triggering condition information 303 may include information based on information about the contexts defined earlier above.

The activity notification triggering condition information 303 may be input by the user of the first device 110 or generated by the first device 110. The first device 110 may generate the activity notification triggering condition information 303 based on analysis of the activity information 301. Analysis of the activity information 301 by the first device 110 may be performed differently according to types of activity information 301. For example, if the activity information 301 is text information, the first device 110 may perform a process of analyzing text information to generate the activity notification triggering condition information 303. If activity information 301 is audio information, the first device 110 may perform a process of analyzing audio information to generate the activity notification triggering condition information 303.

The additional information 304 may include at least one piece of app execution information related to an activity, content related to an activity, e.g., an image, video, music, memo, or document, a URL related to an activity, metadata related to an activity, coupon or ticket information related to an activity, product information related to an activity, traffic information related to an activity, bill information related to an activity, payment information related to an activity, e.g., e-money information, or the like.

The additional information 304 may be input by the user of the first device 110 or generated by the first device 110. The first device 110 may generate the additional information 304 according to a preset condition or upon a user's request. For example, according to an embodiment of the present disclosure, if a notification of making a call in response to a declined call is registered, the first device 110 may generate information whereby an application of making a call may be executed, as the additional information 304.

Meanwhile, the process of editing or canceling an activity notification of FIG. 2 indicates editing or canceling the registered information about the activity notification. The editing of the information about the activity notification may include at least one of modifying, removing, and adding information about the registered information about the activity notification, but is not limited thereto.

A process of checking an activity notification triggering condition is a process of checking whether a condition for triggering an activity notification is satisfied or not, by using the registered or edited information about the activity notification.

A process of triggering an activity notification indicates outputting an activity notification if an activity notification triggering condition is determined as satisfied in the process of checking an activity notification triggering condition.

With regard to Example 1 through example 8 illustrated in FIG. 2, as the process of registering an activity notification is performed by the first device 110 as described above, a management device for managing the process of registering an activity notification is the first device 110.

Referring to Example 1 of FIG. 2, a management device for managing a process of editing or canceling an activity notification, a process of checking an activity notification triggering condition, and a process of triggering an activity notification is the first device 110. This indicates that all processes of providing an activity notification are performed by the first device 110.

Figure 4:
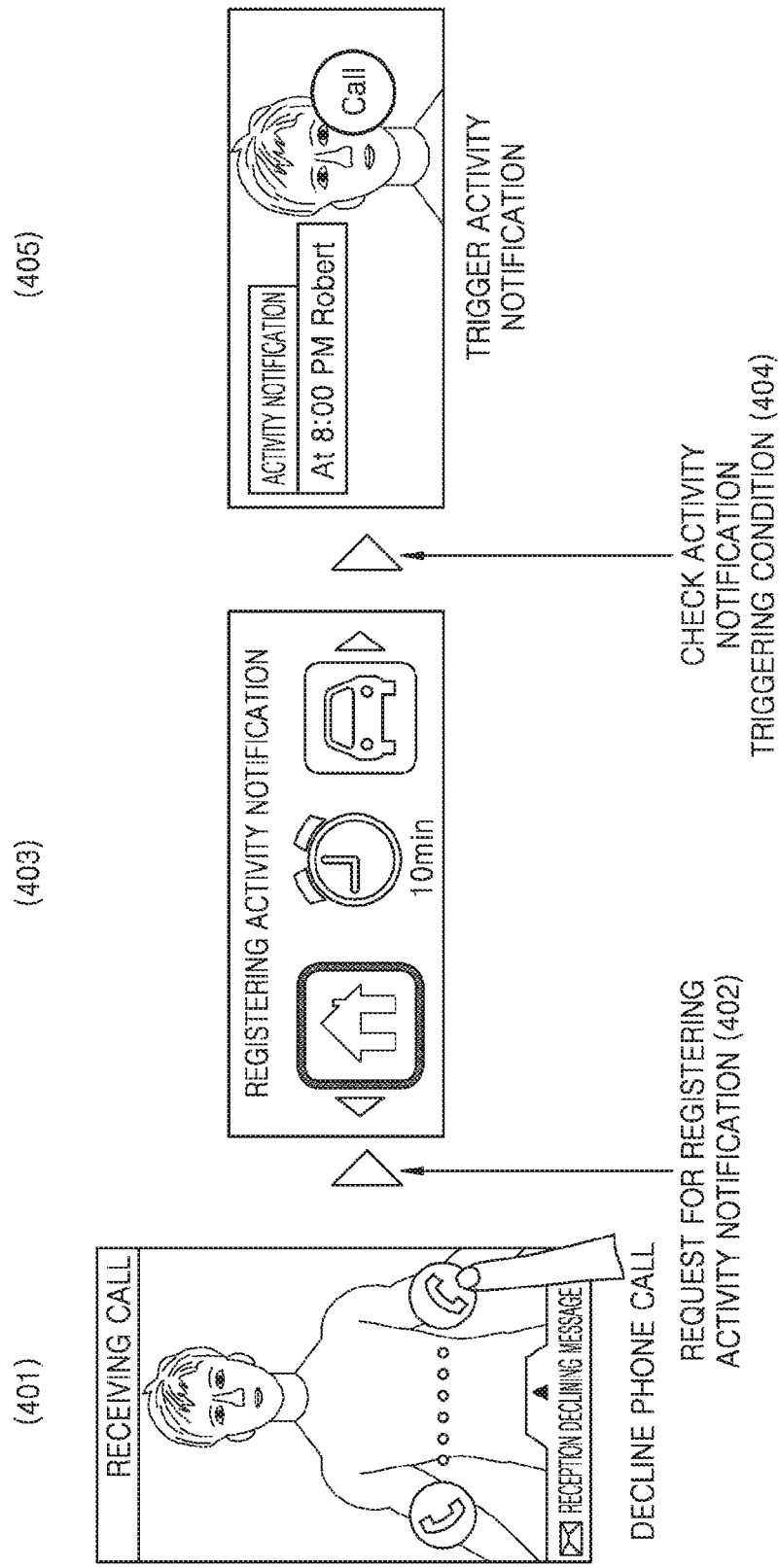
FIG. 4 is an example of providing an activity notification according to an embodiment of the present disclosure.

FIG. 4 is an example of providing an activity notification according to an embodiment of the present disclosure, where a management device of all processes of providing an activity notification is a first device.

Referring to FIG. 4, an activity notification related to re-dialing is illustrated. That is, after the user of the first device 110 declines to answer a call from Robert in operation 401, registration of an activity notification is requested by using the first device 110 in operation 402.

A request for registering an activity notification, by using the first device 110 may be made via a user interface (UI) or a graphic user interface (GUI) based on an activity notification framework. A user interface based on an activity notification framework regarding a request for registering an activity notification may be provided as a menu item or an item included in a common area included in a screen displayed on the first device 110.

FIG. 5A illustrates user interface about a request for registering an activity notification according to an embodiment of the present disclosure.

Referring to FIG. 5A, a screen 501 is an example of a user interface regarding a request for registering an activity notification in the form of a menu item described above. A screen 502 of FIG. 5A is an example of a user interface regarding a request for registering an activity notification in the form of an item included in a common area 505.

Menu items 503 illustrated in FIG. 5A may be provided via a menu button control or a touch. When an activity notification registration item 504, included in the menu items 503, is selected, the first device 110 may perform registering an activity notification.

The common area 505 illustrated on the screen 502 of FIG. 5A is an area displayed regardless of an application or a service that is currently being executed by the first device 110. The common area 505 may be an indicator area set as default in the first device 110 or an area independent from the indicator area. The indicator area is an area where at least one piece of state information, such as a battery state of the first device 110, a communication state of the first device 110, an information reception state of the first device 110, and an operating state of the first device 110, may be displayed. The common area 505 is in an upper display area of the first device 110 on the screen 502 of FIG. 5A but is not limited thereto.

For example, a display area of the common area 505 may be located in one of a leftmost area, a rightmost area, and a lowermost area on a screen of the first device 110. An activity notification registration item 504, provided via the screen 501, and an activity notification registration item 506, provided via the screen 502, of FIG. 5A may be expressed in one of a text form, a symbol form, and a combined text and symbol form, but are not limited thereto.

According to a request for registering an activity notification of operation 402 of FIG. 4, the first device 110 may display information based on a menu item of activity notification registration in operation 403. Information based on a menu item of activity notification registration may include information about registerable activity notifications, or in other words, information about activity notifications that may be registered. When registering of an activity notification is requested via a user interface as illustrated in FIG. 5A, the first device 110 may provide a user interface corresponding to a menu item of registering an activity notification as illustrated in FIG. 5B.

Figure 5B:
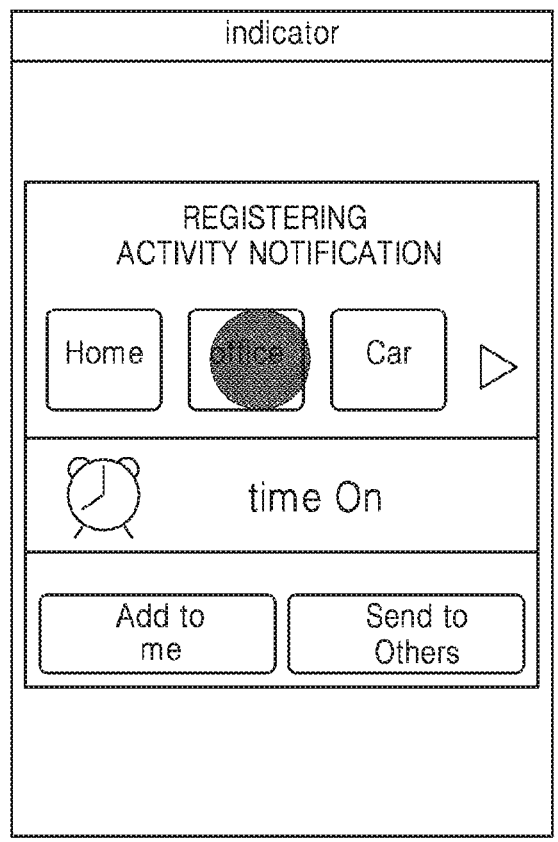
FIG. 5B illustrates user interface information about registering an activity notification according to an embodiment of the present disclosure.

Information that may be registered in a menu item of registering an activity notification illustrated in FIG. 5B may include at least one piece of information about a position, information about time, and information about a management device. However, information that is registerable based on a menu item of registering an activity notification may include at least one piece of information about a context in which above-described activity notifications may be triggered and information about a management device that may be set.

FIG. 5B illustrates user interface information about registering an activity notification according to an embodiment of the present disclosure.

Referring to FIG. 5B, a management device may be set using "Add to me" and "Send to Others" buttons and/or touch items. "Add to me" indicates setting a management device based on the user of the first device 110. If the user of the first device 110 has a plurality of devices, and an "Add to me" button is selected via the first device 110, the first device 110 may display a list of a plurality of devices. A plurality of devices included in the list of the plurality of devices may include at least one external device of the first device 110. The at least one external device included in the list of the plurality of devices is a device of the same user as the user of the first device 110.

"Send to Others" indicates setting a management device based on a user who is different from the user of the first device 110. If another user who may set the management device has a plurality of devices, and a "Send to Others" button is selected via the first device 110, the first device 110 may display a list of a plurality of devices of the other user. The plurality of devices included in the list of the plurality of devices of the other user may be devices of a same single user. The plurality of devices included in the list of the plurality of devices of the other user may include devices of different users.

A user interface used to set a management device is not limited to FIG. 5B. For example, the first device 110 may separately display each activity notification process as illustrated in FIG. 2, and may provide a user interface displaying "Add to me" and "Send to Others" buttons (touch items) illustrated in FIG. 5B on an area on which each activity notification process is displayed as a user interface for setting a management device.

Figure 5C:
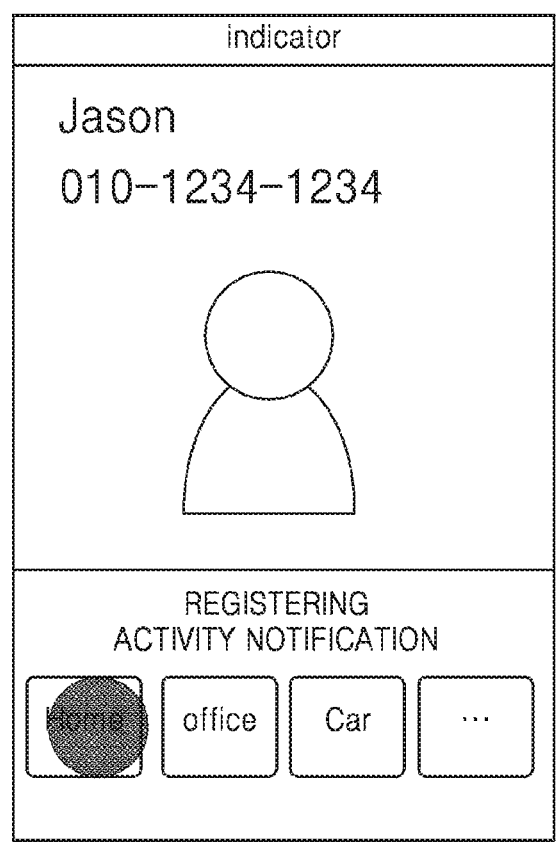
FIG. 5C illustrates user interface information about registering an activity notification according to an embodiment of the present disclosure.

FIG. 5C illustrates user interface information about registering an activity notification according to an embodiment of the present disclosure.

Registering of an activity notification according to an embodiment of the present disclosure is not limited as illustrated in FIG. 5A. That is, referring to FIG. 5C, the first device 110 may provide a user interface for registering of an activity notification via a screen of an application or a service that is currently executed by the first device 110. The first device 110 may provide a user interface as illustrated in FIG. 5C according to user input information but is not limited thereto. User input information for providing the user interface as illustrated in FIG. 5C may be preset. For example, in the case of a phone call application, the first device 110 may provide a user interface for performing registering of an activity notification, as illustrated in FIG. 5C, according to user input information indicating declining of a call, as illustrated in FIG. 4.

In registering of an activity notification by using the menu items provided in operation 403 of FIG. 4, the first device 110 may move the menu items for registering of an activity notification to the left or right based on a touch input, such as a swipe, and may select an item based on a touch input indicating a selection, but embodiments of the present disclosure are not limited thereto. For example, if menu items for registering of an activity notification are arranged two-dimensionally, the first device 110 may move the menu items for registering of an activity notification to the left or right or upward or downward based on a touch input.

When the process of registering an activity notification is completed in operation 403 of FIG. 4, the first device 110 checks an activity notification triggering condition in operation 404. If it is determined that a condition for triggering the registered activity notification is satisfied as a result of checking the activity notification triggering condition by using the first device 110, the first device 110 triggers an activity notification in operation 405.

The triggered activity notification may include the activity information 301 illustrated in FIG. 3 but is not limited thereto. The triggered activity notification may include the activity information 301 and the additional information 304 illustrated in FIG. 3. The additional information 304 included in the triggered activity notification may be referred to as information whereby an activity may be executed. For example, if the triggered activity notification is "re-dial", the additional information 304 may include information for retrieving a phone call application whereby a call may be immediately made.

FIGS. 6, 7, 8, 9, 10, 11, and 12 are examples of providing activity notification according to various embodiments of the present disclosure.

Figure 6:
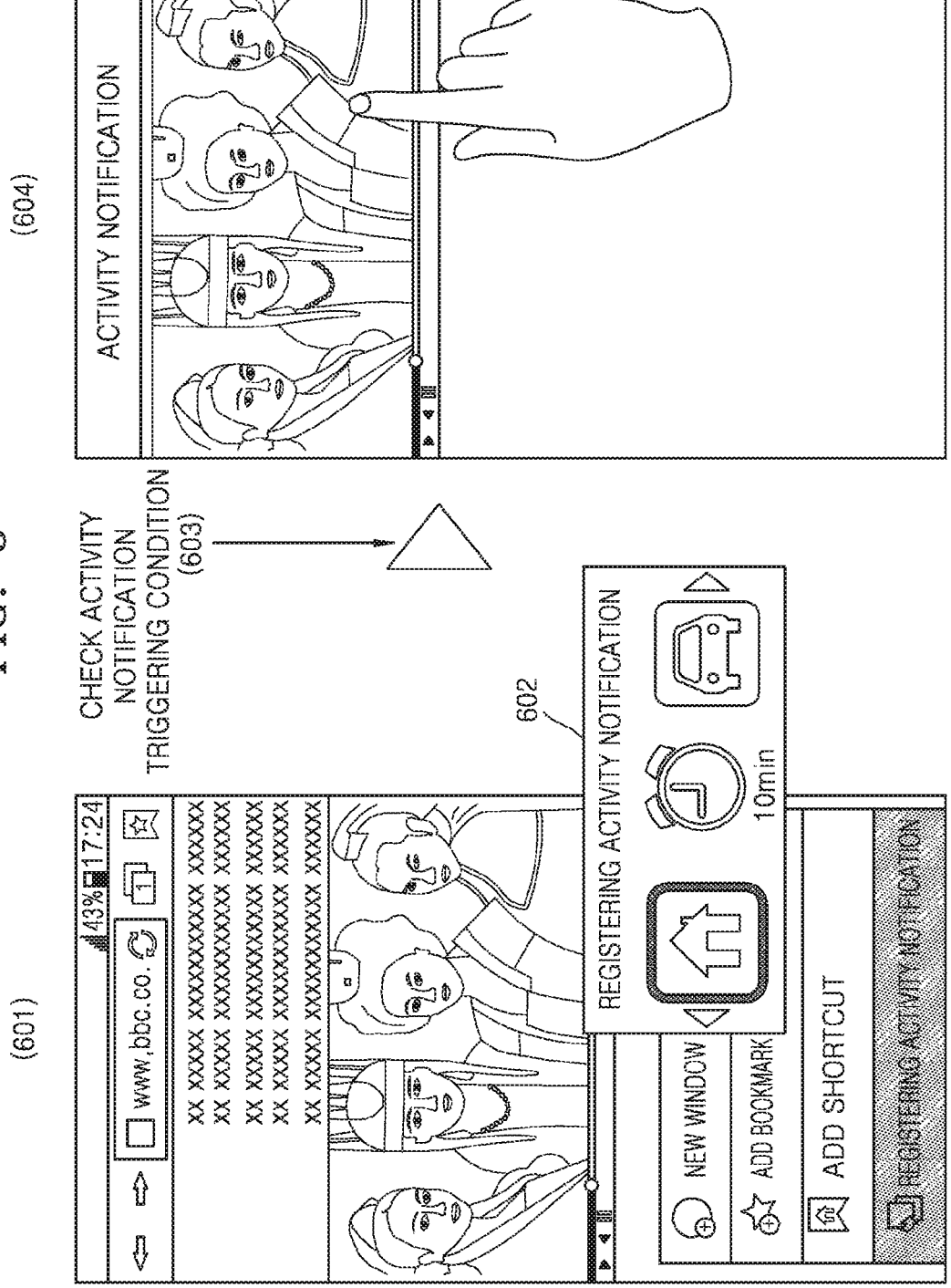

Referring to FIG. 6, another example of providing an activity notification where a management device for all processes of providing an activity notification is a first device 110.

FIG. 6 illustrates an activity notification regarding continuous video play according to an embodiment of the present disclosure.

That is, if a user who is watching a video by using the first device 110 wishes to replay the video at home from a point where the video was stopped in operation 601, and when a process of registering an activity notification is performed in operation 602, the first device 110 performs a process of checking an activity notification triggering condition in operation 603. That is, in operation 603, the first device 110 may check whether logical position information of the first device 110 is within a home of the user of the first device 110. If logical position information of the first device 110 is determined to be within the home of the user of the first device 110, the first device 110 performs a process of triggering an activity notification in operation 604. A triggered activity notification may include information whereby continuous replay of a video may be immediately executed. Accordingly, the user of the first device 110 may continue watching the video from a point where it was stopped, by using execution information included in the information about the triggered activity notification.

FIG. 7 is another example of providing an activity notification where a management device for all processes of providing an activity notification is the first device 110 according to an embodiment of the present disclosure.

Referring to FIG. 7, the first device 110 may perform a process of registering an activity notification regarding things to be done by using a memo application in operations 701 and 702. The first device 110 may perform a process of checking an activity notification triggering condition in operation 703. When it is determined by the first device 110 that an activity notification triggering condition is satisfied, the first device 110 may perform a process of triggering an activity notification in operation 704. A triggered activity notification may be based on information input via the memo application set in the first device 110, as illustrated in operation 701 of FIG. 7.

Figure 8:
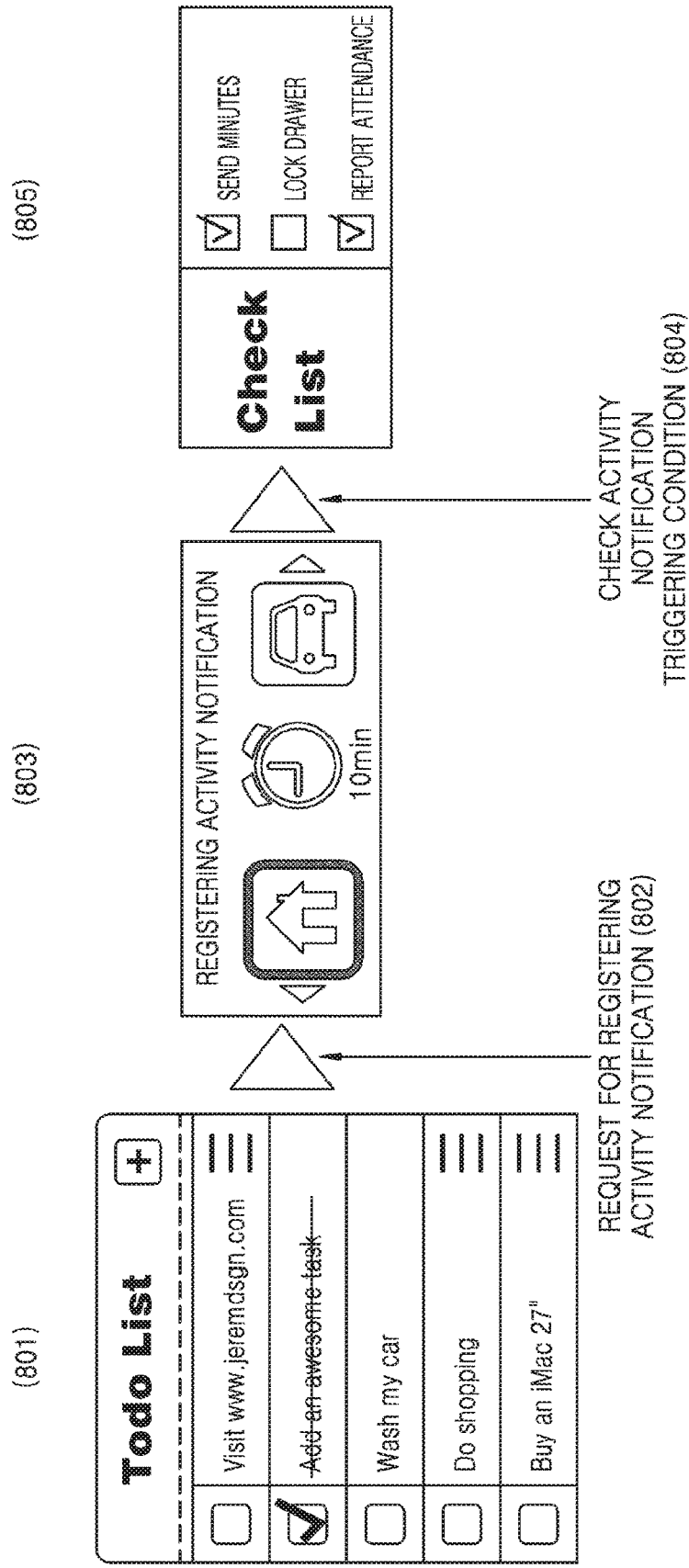

FIG. 8 is another example of providing an activity notification where a management device for all processes of providing an activity notification is the first device 110 according to an embodiment of the present disclosure.

Referring to FIG. 8, in operations 801, 802, and 803, the first device 110 may perform a process of registering an activity notification based on a to-do list shown in operation 801. The first device 110 may perform a process of checking an activity notification triggering condition in operation 804. If the activity notification triggering condition is satisfied, the first device 110 may perform a process of triggering an activity notification in operation 805.

Figure 9:
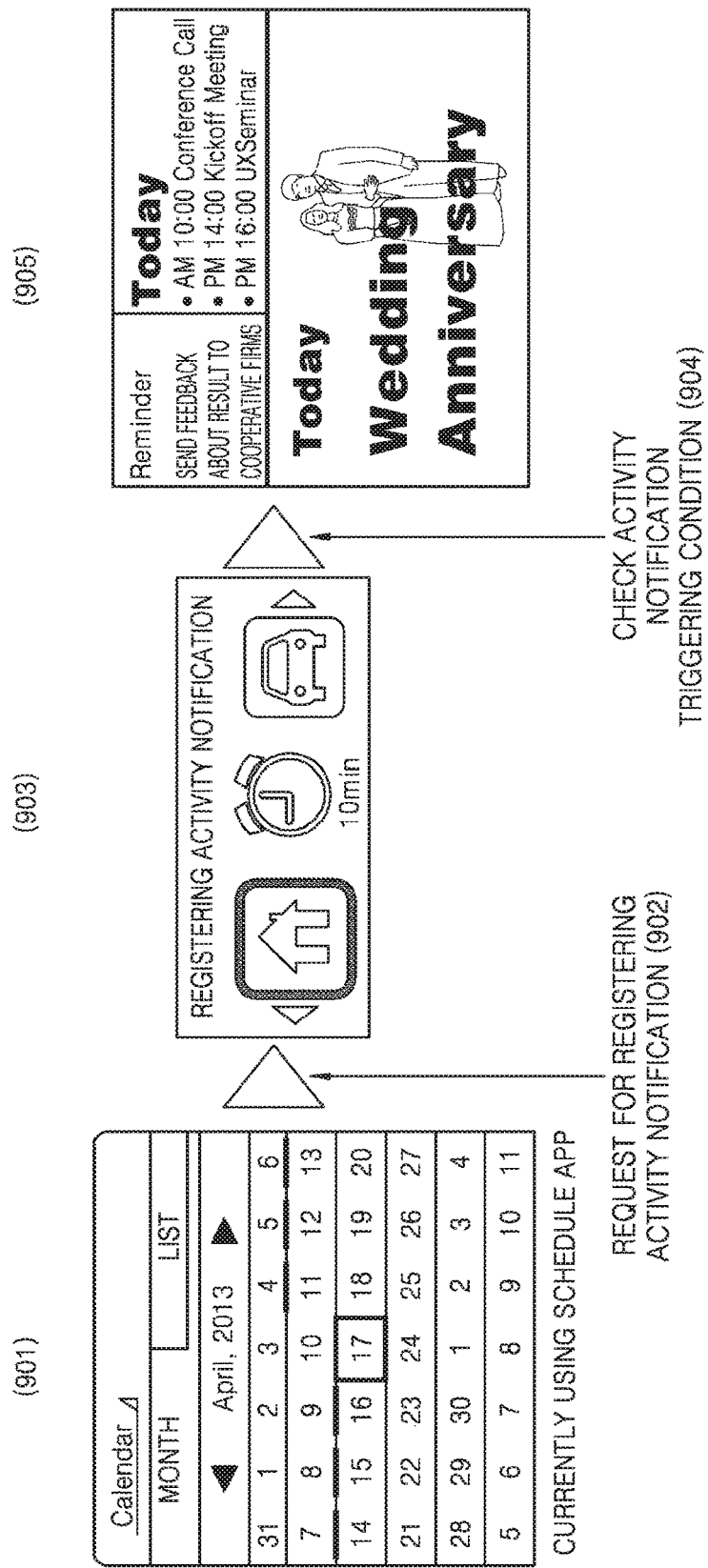

FIG. 9 is another example of providing an activity notification where a management device for all processes of providing an activity notification is the first device 110 according to an embodiment of the present disclosure.

Referring to FIG. 9, during use of a schedule application by the first device 110 in operation 901, the first device 110 may perform a process of registering an activity notification in operations 902 and 903. After performing a process of checking an activity notification triggering condition by using the first device 110 in operation 904, the first device 110 may perform a process of triggering an activity notification in operation 905.

Figure 10:
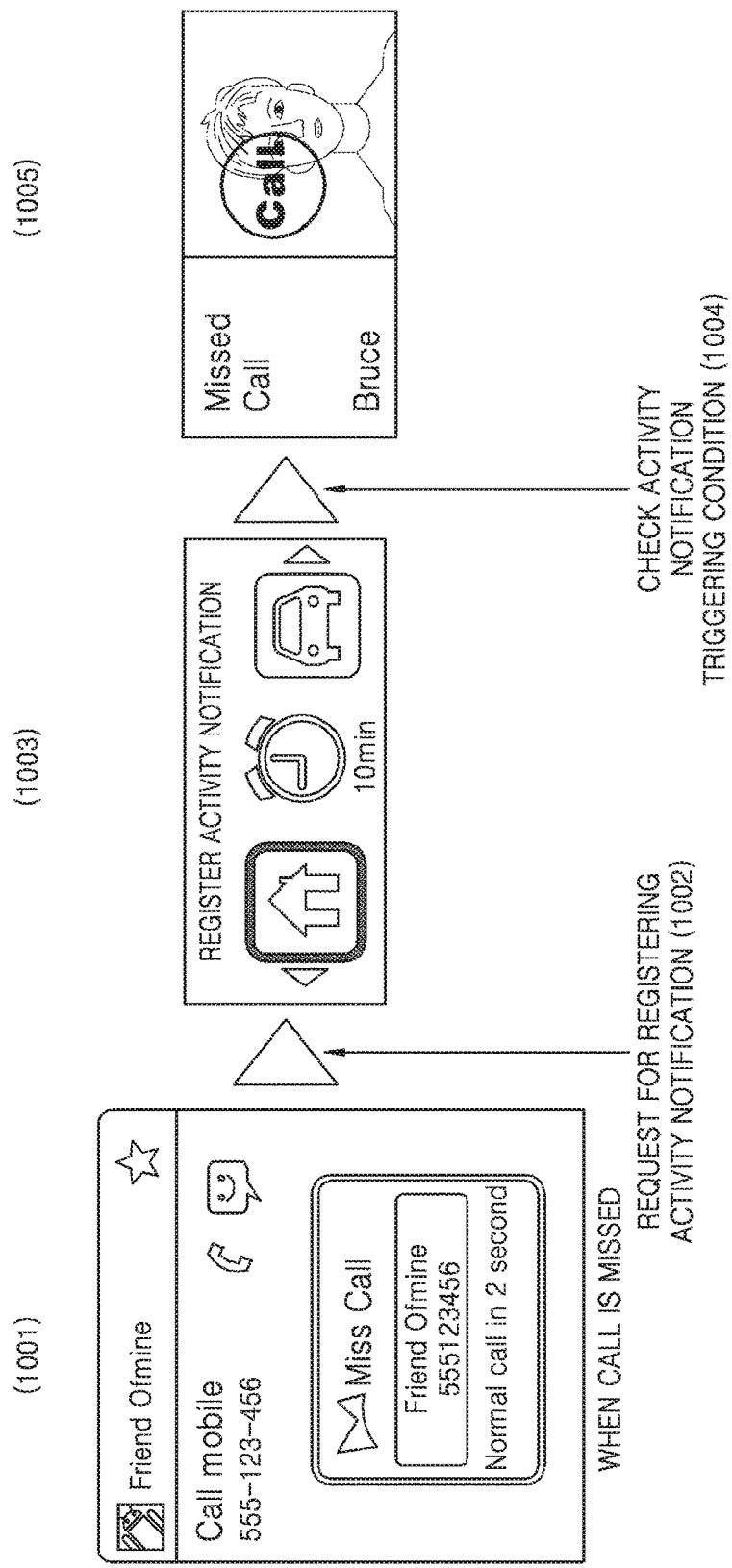

FIG. 10 is another example of providing an activity notification where a management device for all processes of providing an activity notification is the first device 110 according to an embodiment of the present disclosure.

Referring to FIG. 10, the first device 110 may perform a process of registering an activity notification with respect to a missed call in operations 1001, 1002, and 1003. After performing a process of checking an activity notification triggering condition in operation 1004, the first device 110 may perform a process of triggering an activity notification in operation 1005.

Figure 11:
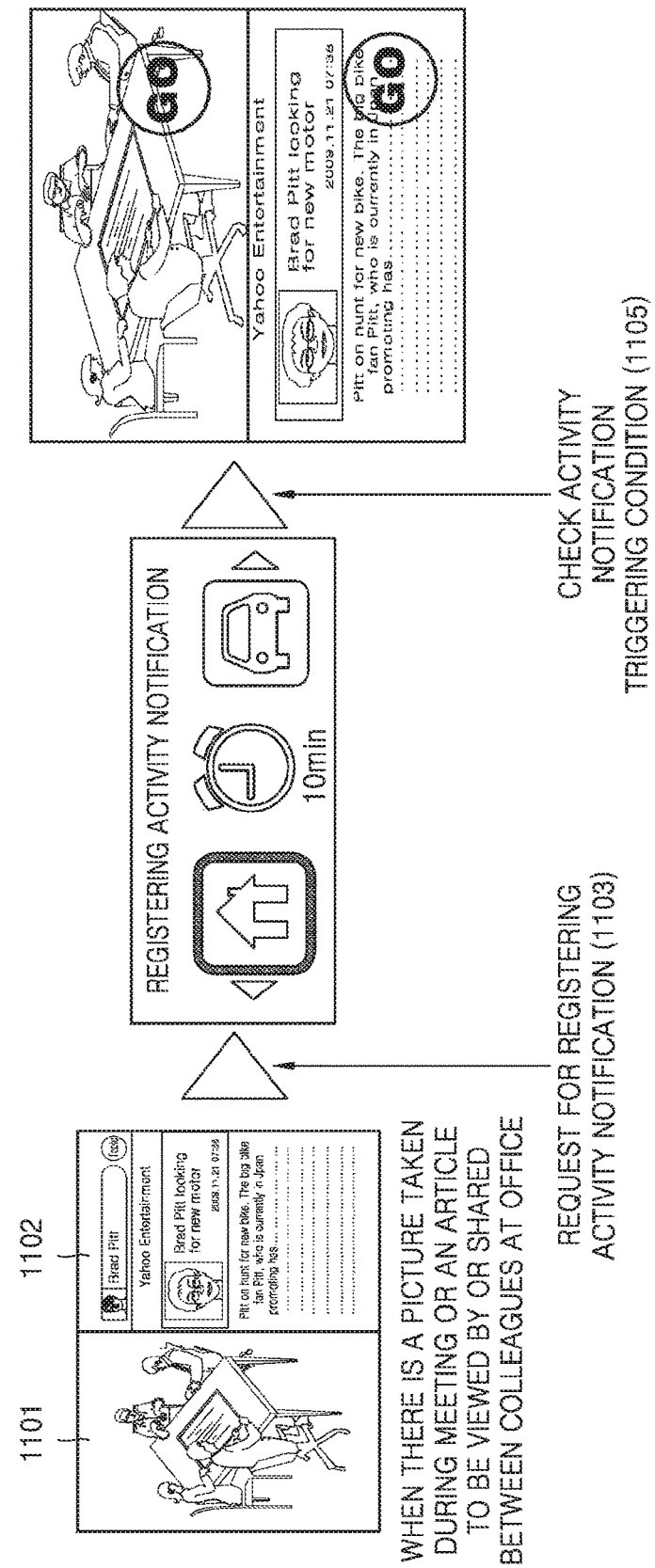

FIG. 11 is another example of providing an activity notification where a management device for all processes of providing an activity notification is the first device 110 according to an embodiment of the present disclosure.

Referring to FIG. 11, the first device 110 may perform a process of registering an activity notification with respect to a picture 1101 taken during a meeting or an article 1102 to be viewed by or shared between office colleagues in operations 1103 and 1104. The first device 110 may perform a process of checking an activity notification triggering condition in operation 1105. If logical position information of the first device 110 is at an office, the first device 110 may perform a process of triggering an activity notification in operation 1106. A triggered activity notification may include execution information, e.g., go, whereby the picture 1101 or the article 1102 may be immediately viewed.

Figure 12:
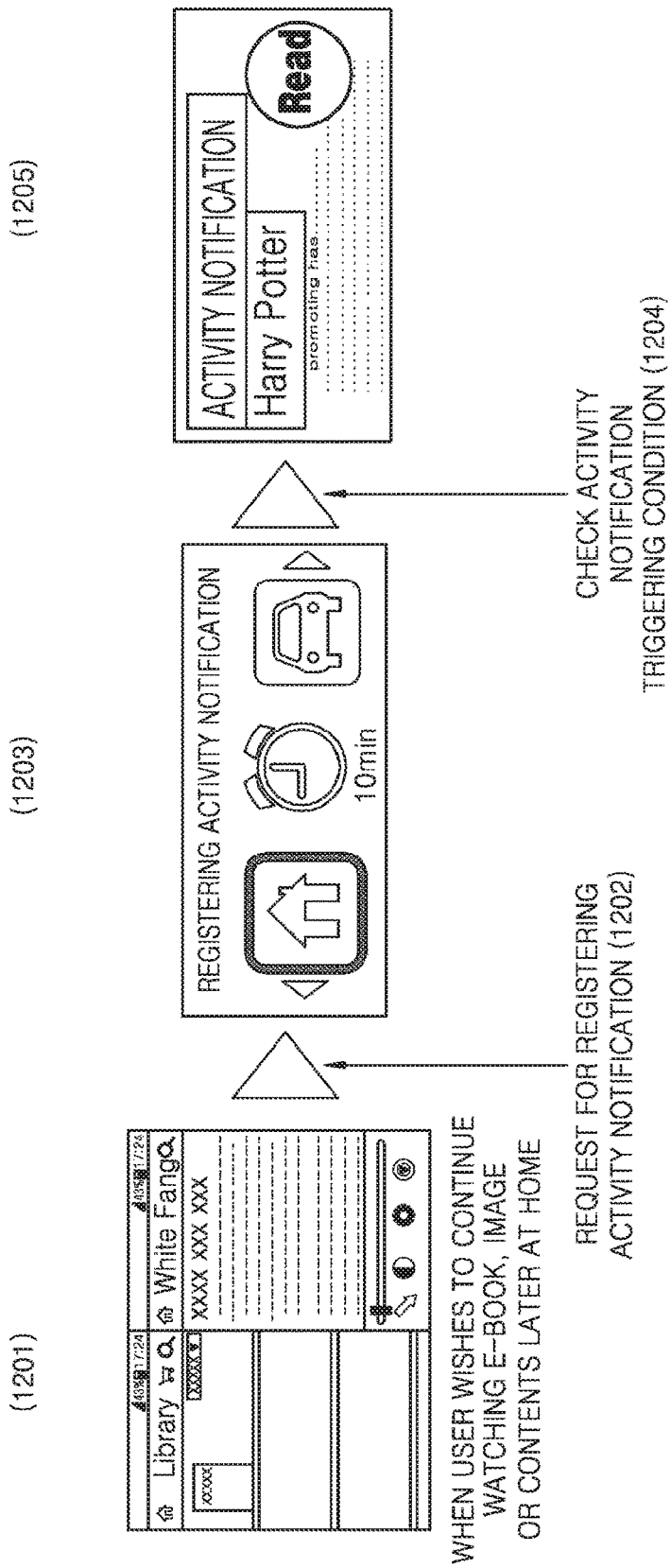

FIG. 12 is another example of providing an activity notification where a management device for all processes of providing an activity notification is the first device 110 according to an embodiment of the present disclosure.

Referring to FIG. 12, while viewing an e-book by using the first device 110 in operation 1201, the first device 110 may perform a process of registering an activity notification in operations 1202 and 1203. The first device 110 may perform a process of checking an activity notification triggering condition in operation 1204. If the activity notification triggering condition is satisfied, the first device 110 may perform a process of triggering an activity notification in operation 1205. A triggered activity notification may include activity execution information, e.g., read.

Referring to FIGS. 4, 6, 7, 8, 9. 10. 11, and 12, all processes of providing an activity notification are described as being performed by the first device 110. However, as in Example 2 through Example 8 of FIG. 2, some processes may be performed by other devices, e.g., the second device 120 or the server 130. It may be possible to perform some processes by other device by setting a management device for each process in a process of registering an activity notification, performed by the first device 110.

Referring to Example 2 of FIG. 2, the second device 120, D2 performs a process of triggering an activity notification, and the first device 110, D1 performs other processes. When processes of providing an activity notification is managed as in Example 2 of FIG. 2, an activity notification illustrated in operations 405, 604, 704, 604, 705, 805, 905, and 1005 illustrated in FIGS. 4 and 6 through 12 may be triggered by the second device 120.

In Example 2 of FIG. 2, the first device 110 performs a process of checking an activity notification triggering condition. Thus, when the first device 110 transmits information about a result of determining that the activity notification triggering condition is satisfied to the second device 120, the second device 120 performs a process of triggering an activity notification.

When determination result information indicating that a plurality of activity notification triggering conditions are satisfied, is received, the second device 120 may sequentially perform a plurality of processes of triggering an activity notification. As the plurality of processes of triggering an activity notification are sequentially performed, the second device 120 may display a plurality of activity notification pages.

Figures 13A, 13B:
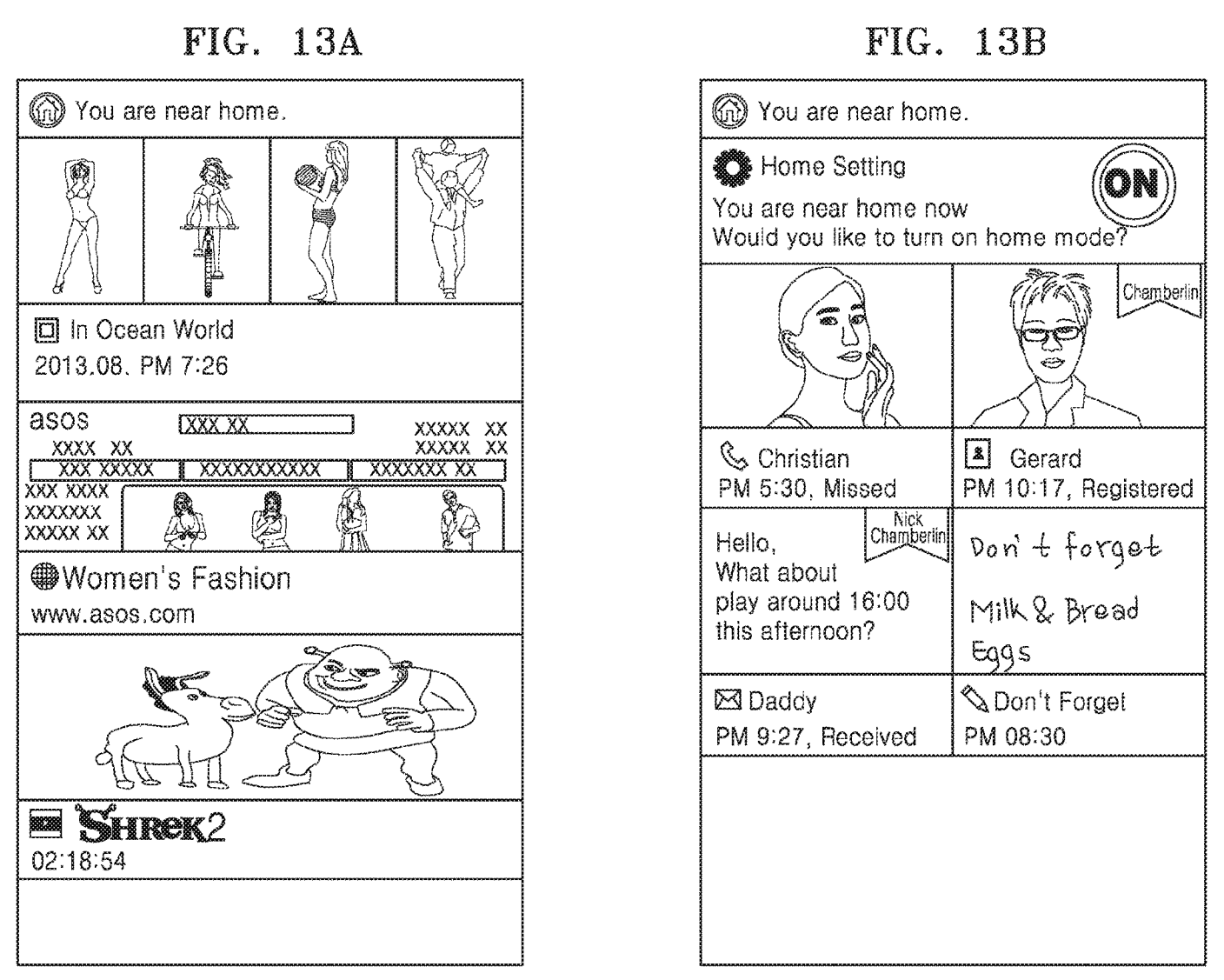

FIGS. 13A and 13B illustrate examples of triggering of a plurality of activity notifications according to an embodiment of the present disclosure.

Referring to FIG. 13A, the second device 120 may display a plurality of activity notifications due to a plurality of processes of triggering an activity notification, on a single screen, like a push notification. An activity notification triggering condition illustrated in FIG. 13A is that a user of the second device 120 is near home. Determination result information indicating that a condition for triggering a plurality of activity notifications is satisfied may be received from a plurality of external devices. The determination result information indicating that a condition for triggering a plurality of activity notifications is satisfied may be received from one external device, e.g., the first device 110.

A triggered activity notification may be received with the information about a determination result described above, but is not limited thereto. For example, before a condition for triggering an activity notification is satisfied, the first device 110 may transmit information about a management device, indicating that the second device 120 is set as a management device of a process of triggering an activity notification, and an activity notification to the second device 120.

If an activity notification and information about a management device are received from the first device 110 before an activity notification triggering condition is satisfied, the second device 120 may trigger an activity notification according to a user's request, and if information about a result of determining that an activity notification triggering condition is satisfied is received from the first device 110, the second device 120 may re-trigger an activity notification.

When triggering an activity notification according to a request of the user of the second device 120, if a plurality of activity notifications are to be triggered, the second device 120 may trigger the plurality of activity notifications altogether. FIG. 13B illustrates a screen where a plurality of activity notifications are triggered and are in the form of cards.

Referring to Example 3 of FIG. 2, the first device 110 performs a process of registering an activity notification and a process of editing or canceling an activity notification, and the second device 120 performs a process of checking an activity notification triggering condition and a process of triggering an activity notification.

Referring to Example 3 of FIG. 2, the first device 110 may transmit to the second device 120 information about a registered activity notification in order to separately perform processes of providing an activity notification as illustrated in Example 3. After transmitting the registered information about the activity notification to the second device 120, the first device 110 may delete the registered information about the activity notification or maintain a state in which the information is stored in the first device 110.

Referring to Example 4 of FIG. 2, the first device 110 performs a process of registering an activity notification, and the second device 120 performs a process of editing or canceling an activity notification, a process of checking an activity notification triggering condition, and a process of triggering an activity notification. Referring to Example 4 of FIG. 2, after information about an activity notification is registered, the first device 110 may transmit to the second device 120 the registered information about the activity notification.

Referring to Example 5 of FIG. 2, the first device 110 performs a process of registering an activity notification and a process of editing or canceling an activity notification, the server 130 performs a process of checking an activity notification triggering condition, and the second device 120 performs a process of triggering an activity notification. Referring to Example 5 of FIG. 2, the first device 110 transmits to the server 130 information about the registered activity notification and the first device 110 and the server 130 may jointly manage the information about the registered activity notification. When the information about the registered activity notification is edited by the first device 110, the first device 110 may synchronize information about an activity notification managed by the server 130 and information about an edited activity notification.

The server 130 may monitor the first device 110 and/or the second device 120 according to information about an activity notification triggering condition in order to check whether an activity notification triggering condition is satisfied. As a result of monitoring, if the activity notification triggering condition is satisfied, the server 130 may transmit, to the second device 120, information indicating that the activity notification triggering condition is satisfied. When transmitting information indicating that the activity notification triggering condition is satisfied, to the second device 120, the server 130 may also transmit an activity notification to be triggered, but embodiments of the present disclosure are not limited thereto. For example, the first device 110 may transmit, to the second device 120, the activity notification to be triggered. Alternatively, before an activity notification triggering condition is satisfied, the server 130 may transmit, to the second device 120, the activity notification.

Referring to Example 6 of FIG. 2, the first device 110 performs a process of registering an activity notification and a process of triggering an activity notification, and the server 130 or the second device 120 performs a process of editing or canceling an activity notification and a process of checking an activity notification triggering condition. Thus, when a process of registering an activity notification is completed by the first device 110, the first device 110 may transmit information about the registered activity notification to the server 130 or the second device 120.

Referring to Example 6 of FIG. 2, after transmitting the information about the registered activity notification to the server 130 or the second device 120, the first device 110 may delete the information about the registered activity notification. However, when the first device 110 and the server 130 or the first device 110 and the second device 120 share the information about the registered activity notification, if the information about the registered activity notification is edited or canceled by the server 130 or the second device 120, the information about an activity notification stored in the first device 110 is also edited or canceled. Accordingly, the information about an activity notification stored in the server 130 or the second device 120 and the information about an activity notification stored in the first device 110 are synchronized.

Referring to Example 7 of FIG. 2, the first device 110 performs a process of registering an activity notification and a process of triggering an activity notification, the second device 120 performs a process of editing or canceling an activity notification, and the server 130 performs a process of checking an activity notification triggering condition.

Referring to Example 7 of FIG. 2, the first device 110 may transmit to the second device 120 information about a registered activity notification, and the second device 120 may transmit, to the server 130, information for performing a process of checking an activity notification triggering condition, e.g., activity notification triggering condition information, but the embodiment of the present disclosure is not limited thereto. For example, the first device 110 may transmit, to the server 130, information for performing a process of checking an activity notification triggering condition. When an activity notification triggering condition is satisfied, the server 130 may transmit to the first device 110 information indicating that an activity notification triggering condition is satisfied.

Referring to Example 8 of FIG. 2, the first device 110 performs a process of registering an activity notification, the server 130 performs a process of editing or canceling an activity notification and a process of checking an activity notification triggering condition, and the second device 120 performs a process of triggering an activity notification. Referring to Example 8 of FIG. 2, after a process of registering an activity notification is completed, the first device 110 may transmit information about an activity notification to the server 130 and transmit an activity notification to the second device 120, but embodiments of the present disclosure are not limited thereto. For example, the server 130 may transmit to the second device 120 the activity notification.

When a management device is set as in Example 2 through Example 8 of FIG. 2, each process illustrated in FIG. 4 and in FIG. 6 through FIG. 12 described above may be performed by using the set management device.

Figure 14:
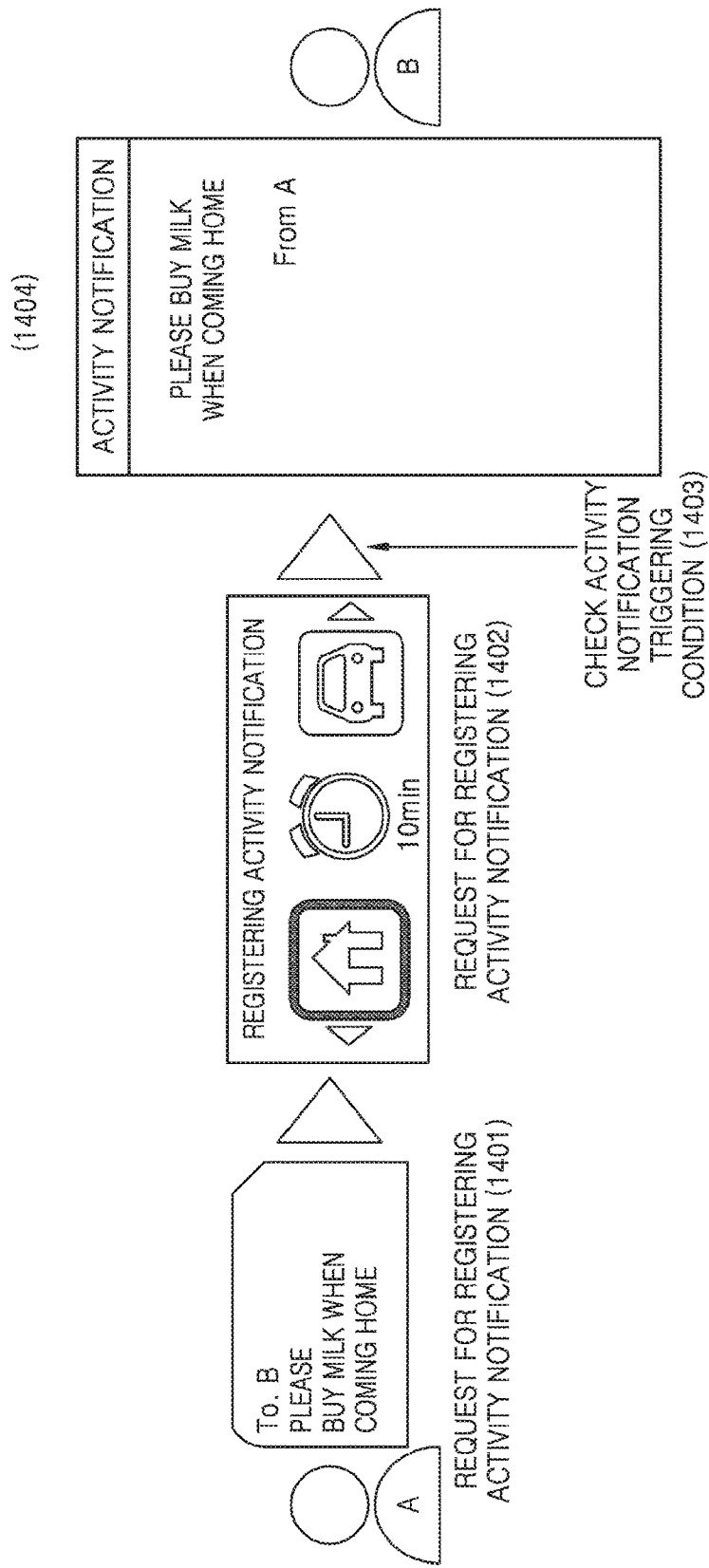
FIGS. 14, 15, and 16 are examples of providing activity notification according to various embodiments of the present disclosure.
Figure 15:
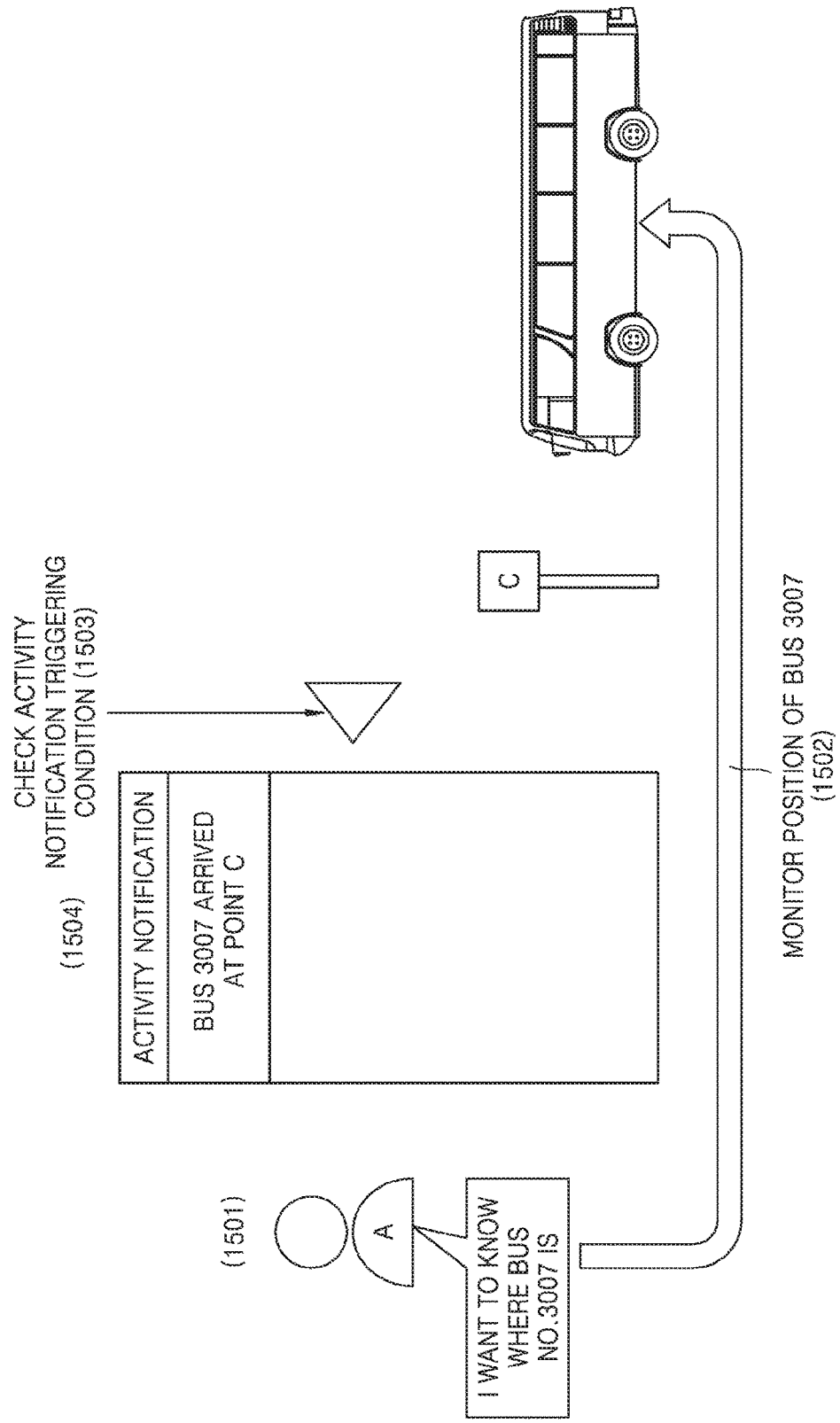
Figure 16:
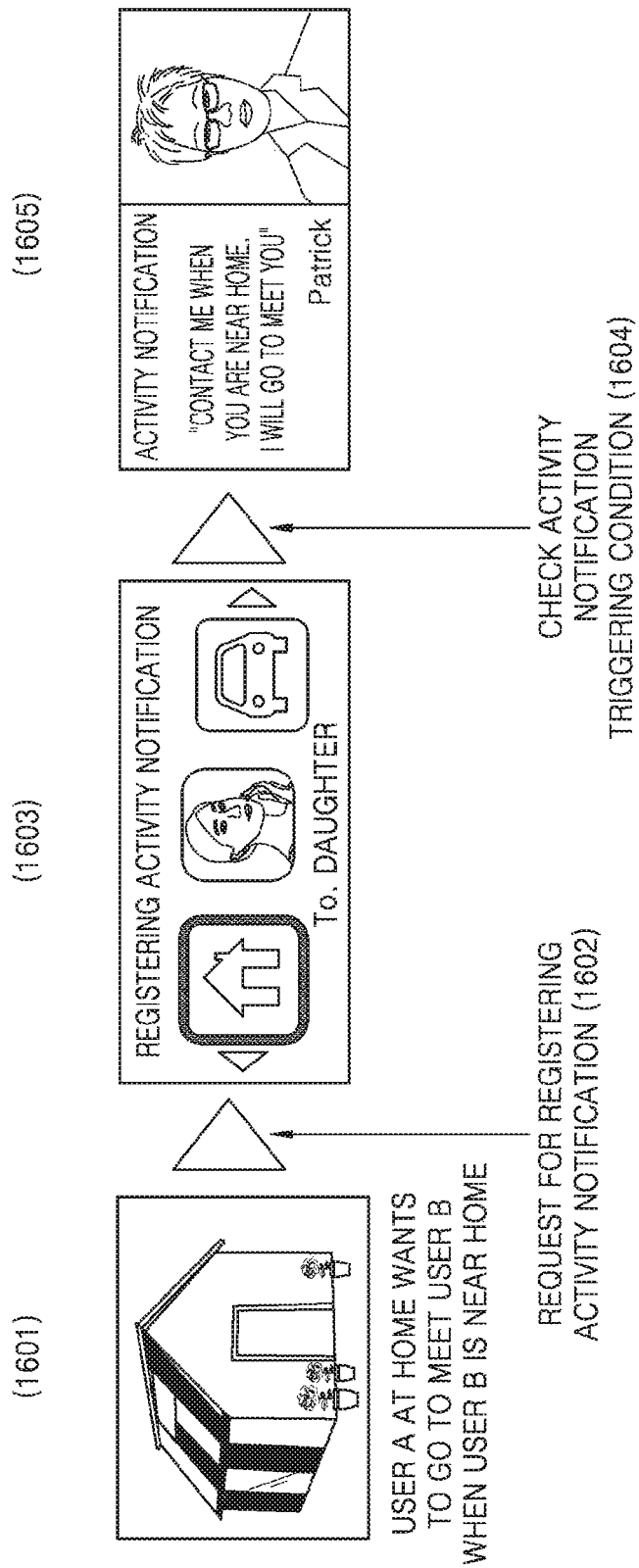

FIGS. 14, 15, and 16 are examples of providing activity notification according to various embodiments of the present disclosure.

Referring to FIG. 14, another example where a device to which information about an activity notification is registered and a device from which an activity notification is triggered are different, is illustrated, according to an embodiment of the present disclosure. That is, user A of the first device 110 provides user B of the second device 120 with an activity notification, "Please buy milk when coming home". The process of providing an activity notification of FIG. 14 may be differently performed depending on how a management device is set according to Example 2 through Example 5 and Example 8 of FIG. 2.

For example, when setting a management device for performing the example illustrated in FIG. 14, as in Example 2 of FIG. 2, the first device 110 may perform a process of registering an activity notification, a process of editing or canceling an activity notification, and a process of checking an activity notification triggering condition in operations 1401, 1402, and 1403. Accordingly, the first device 110 may monitor a position of the second device 120. Monitoring of a position of the second device 120 by the first device 110 may be performed via the server 130 but may also be directly performed via a network. As a result of monitoring, if an activity notification triggering condition is satisfied, the first device 110 transmits an activity notification to the second device 120. Accordingly, the second device 120 performs a process of triggering an activity notification in operation 1404.

For example, when setting a management device for performing an example illustrated in FIG. 14, as Example 8 of FIG. 2, the first device 110 may perform a process of registering an activity notification in operations 1401 and 1402, the server 130 may perform a process of checking an activity notification triggering condition in operation 1403, and the second device 120 may perform a process of triggering an activity notification in operation 1404.

FIG. 15 illustrates an example of providing an activity notification where a management device is set as in Example 6 or Example 7 of FIG. 2 according to an embodiment of the present disclosure. That is, when user A of the first device 110 registers an activity notification by using a message such as "I want to know where the bus No. 3007 I take is", in operation 1501, the first device 110 transmits information about the registered activity notification to the server 130.

Accordingly, the server 130 traces and/or monitors positions of buses No. 3007 to monitor a bus No. 3007 that is closest to a current position of the first device 110 in operation 1502. When the bus No. 3007 that is closest to the first device 110 reaches a point C as is determined in operation 1503 to check an activity notification triggering event, the server 130 transmits to the first device 110 information indicating that an activity notification triggering condition is satisfied and an activity notification, e.g., "bus No. 3007 has arrived at C". Accordingly, the first device 110 performs a process of triggering an activity notification to display a message such as "bus No. 3007 has arrived at point C", in operation 1504.

FIG. 16 illustrates an example where a management device may be set as in one of Example 2 through Example 5 and Example 8 in FIG. 2 according to an embodiment of the present disclosure.

That is, referring to FIG. 16, user A of the first device 110 triggers, to user B of the second device 120, an activity notification, such as "if you call me when near home, I will go to meet you". In operation 1601 through operation 1605 of FIG. 16, a management device may be set as in one of Example 2 through Example 5 and Example 8 of FIG. 2, as described above with reference to FIG. 14. A process of providing an activity notification may be differently performed depending on how a management device is set according to Example 2 through Example 5 and Example 8 of FIG. 2.

FIG. 17 illustrates other examples of a management device set with respect to a process of providing an activity notification according to an embodiment of the present disclosure.

The activity notification providing system 100 of FIG. 1 may set a management device as in Example 1 through Example 8, as illustrated in FIG. 17, but the embodiment of the present disclosure is not limited thereto. FIG. 17 illustrates that information about an activity notification is registered by the server 130.

Referring to Example 1 of FIG. 17, a management device is set such that the server 130 performs a process of registering an activity notification, a process of editing or canceling an activity notification, and a process of checking an activity notification triggering condition, and the first device 110 performs a process of triggering an activity notification.

Referring to Example 2 of FIG. 17, a management device is set such that the server performs a process of registering an activity notification, a process of editing or canceling an activity notification, and a process of checking an activity notification triggering condition, and the second device 120 performs a process of triggering an activity notification.

Referring to Example 3 of FIG. 17, a management device is set such that the server 130 performs a process of registering an activity notification and a process of editing or canceling an activity notification, and the first device 110 performs a process of checking an activity notification triggering condition and a process of triggering an activity notification.

Referring to Example 4 of FIG. 17, a management device is set such that the server 130 performs a process of registering an activity notification and a process of editing or canceling an activity notification, the first device 110 performs a process of checking an activity notification triggering condition, and the second device 120 performs a process of triggering an activity notification.

Referring to Example 5 of FIG. 17, a management device is set such that the server 130 performs a process of registering an activity notification and a process of editing or canceling an activity notification, the second device 120 performs a process of checking an activity notification triggering condition, and the first device 110 performs a process of triggering an activity notification.

Referring to Example 6 of FIG. 17, a management device is set such that the server 130 performs a process of registering an activity notification, and the first device 110 performs a process of editing or canceling an activity notification, a process of checking an activity notification triggering condition, and a process of triggering an activity notification.

Referring to Example 7 of FIG. 17, a management device is set such that the server 130 performs a process of registering an activity notification, the first device 110 performs a process of editing or canceling an activity notification, and the second device 120 performs a process of checking an activity notification triggering condition and a process of triggering an activity notification.

Referring to Example 8 of FIG. 17, a management device is set such that the server 130 performs a process of registering an activity notification, and the second device 120 performs a process of editing or canceling an activity notification, a process of checking an activity notification triggering condition, and a process of triggering an activity notification.

Figure 18:
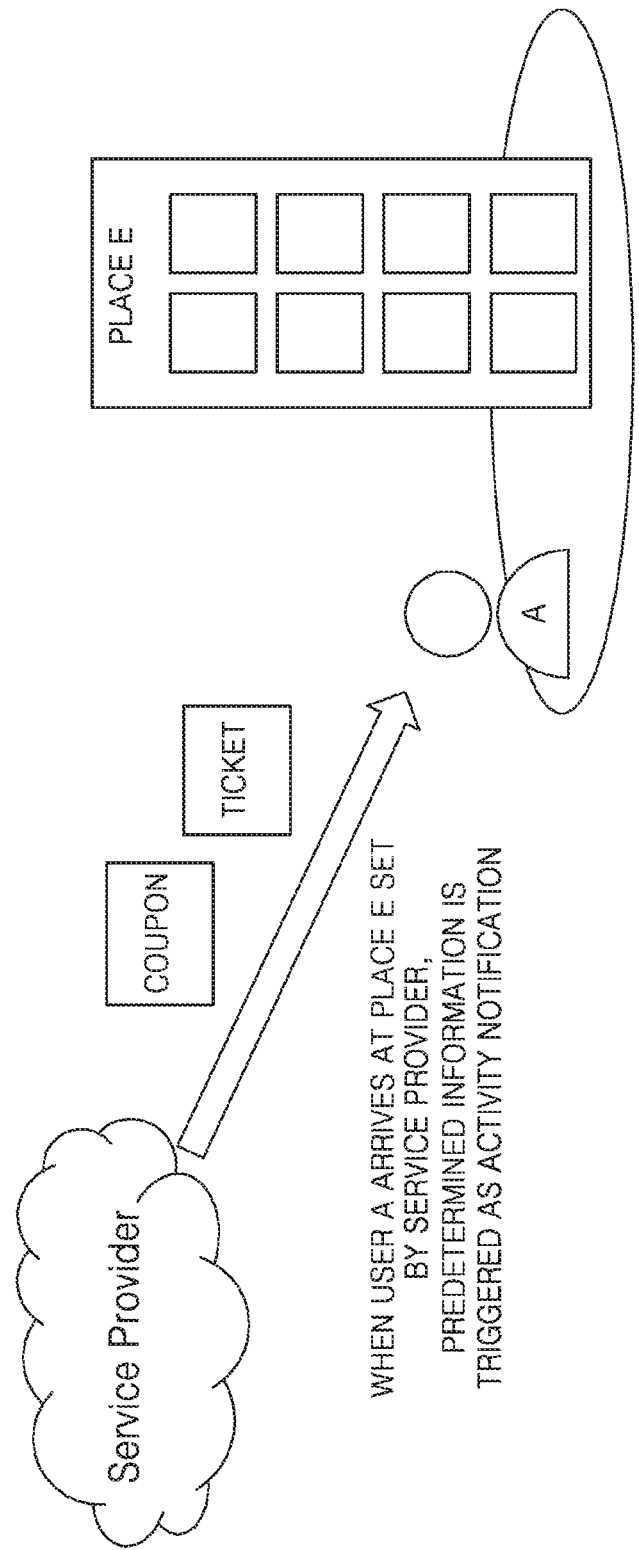
FIG. 18 is an example of providing an activity notification according to an embodiment of the present disclosure.

FIG. 18 is an example of providing an activity notification according to an embodiment of the present disclosure, by setting a management device as in one of Example 1 through Example 8 illustrated in FIG. 17.

That is, referring to FIG. 18, when information about an activity notification is registered by the server 130, and user A having the first device 110 arrives at a set place E, predetermined information, e.g., a coupon or ticket, is triggered as an activity notification. The process of providing an activity notification illustrated in FIG. 18 may be differently performed depending on that a management device is set according to which of Example 1 through Example 8 illustrated in FIG. 17 as described above with reference to FIG. 4, FIG. 6 through FIG. 12, FIG. 14, and FIG. 15.

FIG. 19 is a structural diagram of an activity notification providing system according to an embodiment of the present disclosure.

Referring to FIG. 19, a diagram showing a relationship between devices for performing a method of providing an activity notification by an activity notification providing system 1900, according to another embodiment of the present disclosure, is shown. In FIG. 19, multiple devices may be set as management devices of respective processes to provide an activity notification.

Referring to FIG. 19, the activity notification providing system 1900 includes the first device 110, the second device 120, the server 130, third device 1910_3 through Nth device 1910_N, and a network 1920.

The third device 1910_3 through Nth device 1910_N may include a device like the first device 110. N is an integer equal to or greater than 4.

The network 1920 may include a network based on wireless communication and/or wired communication. A network based on wireless communication may include at least one network based on, for example, short range wireless communication, mobile communication, satellite communication, and broadcasting communication, but the network based on wireless communication is not limited thereto. A network based on wired communication may include at least one network based on, for example, telephone lines or power lines, but the network based on wired communication is not limited thereto.

Short range communication may include, without limitation, at least one of Bluetooth communication, Bluetooth low energy (BLE) communication, NFC, Wi-Fi local area network (WLAN) communication, Zigbee communication, Infrared Data Association (IrDA) communication, Wi-Fi direct (WFD) communication, ultra wideband (UWB) communication, and Ant+ communication.

Mobile communication may include at least one communication whereby a wireless signal, e.g., a voice call signal, a video-call signal, or data in various forms according to transmission and reception of short or multimedia message, may be transmitted and received, based on a base station on a mobile communication network. Satellite communication may include at least one communication based on GPS. Broadcasting communication may include at least one communication whereby data is transmitted, by using at least one of a satellite wave, a terrestrial wave, and a radio wave.

FIG. 20 illustrates other examples of a management device set with respect to a process of providing an activity notification according to an embodiment of the present disclosure, based on an activity notification providing system as illustrated in FIG. 19.

Referring to Example 1 through Example 5 illustrated in FIG. 20, a management device is set by using up to N devices 110, 120, and 1910_3 to 1910_N and the server 130.

Referring to Example 1 of FIG. 20, a management device is set such that the first device 110 performs a process of registering an activity notification and a process of editing or canceling an activity notification, the second device 120 performs a process of checking an activity notification triggering condition, and the third device 1910_3 performs a process of triggering an activity notification.

Referring to Example 2 of FIG. 20, a management device is set such that the first device 110 performs a process of registering an activity notification, the second device 120 performs a process of editing or canceling an activity notification and a process of checking an activity notification triggering condition, and the third device 1910_3 performs a process of triggering an activity notification.

Referring to Example 3 of FIG. 20, a management device is set such that the first device 110 performs a process of registering an activity notification, the second device 120 performs a process of editing or canceling an activity notification, and a process of checking an activity notification triggering condition, and the third device 1910_3 performs a process of triggering an activity notification.

Referring to Example 4 of FIG. 20, a management device is set such that the first device 110 performs a process of registering an activity notification, the second device 120 performs a process of editing or canceling an activity notification, the third device 1910_3 performs a process of checking an activity notification triggering condition, and the Nth device 1910_N performs a process of triggering an activity notification.

Referring to Example 5 of FIG. 20, a management device is set such that the first device 110 performs a process of registering an activity notification is performed by, the server 130 performs a process of editing or canceling an activity notification and a process of checking an activity notification triggering condition, and the Nth device 1910_N performs a process of triggering an activity notification.

Meanwhile, in FIG. 19, the second through Nth devices 120 and 1910_3 through 1910_N and the server 130 may register information about a plurality of activity notifications, and the first device 110 may provide a plurality of activity notifications by triggering the plurality of activity notification. The first device 110 may trigger activity notification in the form of a push notification as illustrated in FIG. 13A or in the form of a card as illustrated in FIG. 13B, but is not limited thereto.

Figure 21:
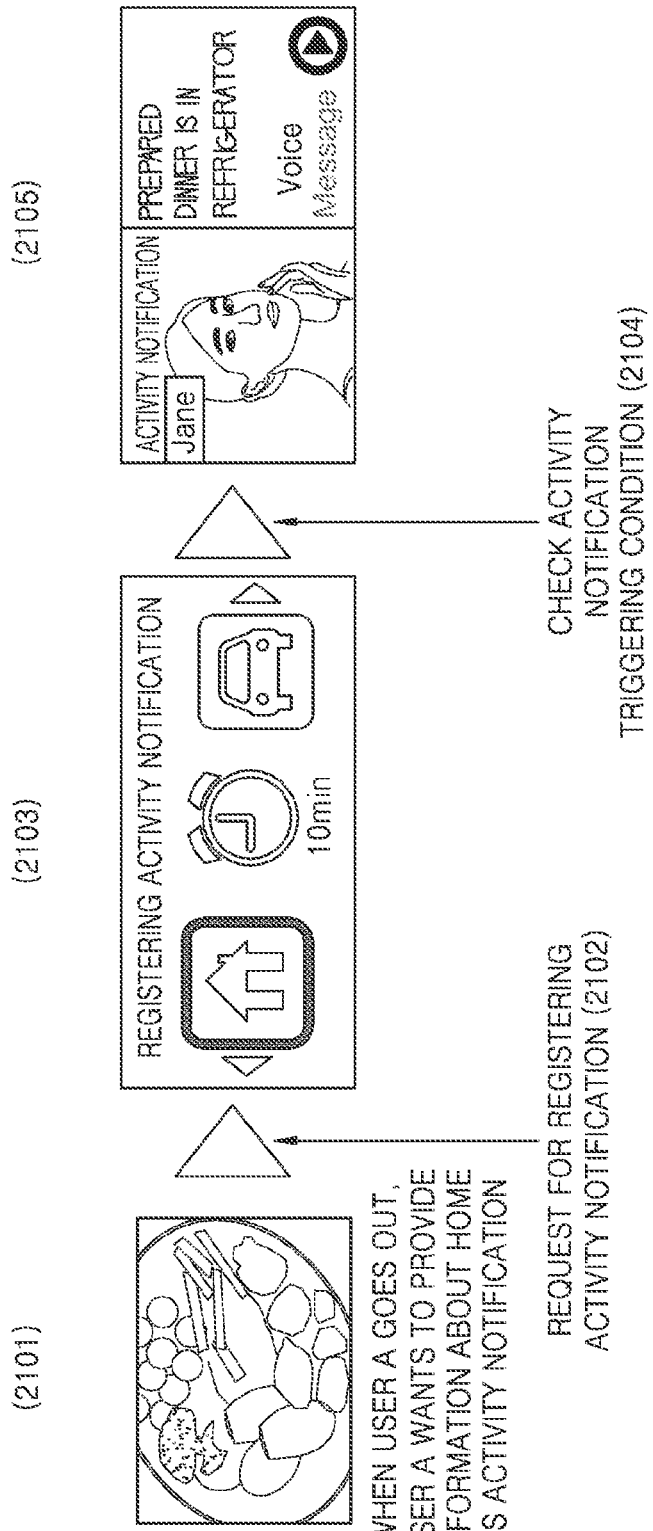
FIGS. 21 and 22 illustrate examples of providing an activity notification according to various embodiments of the present disclosure.
Figure 22:
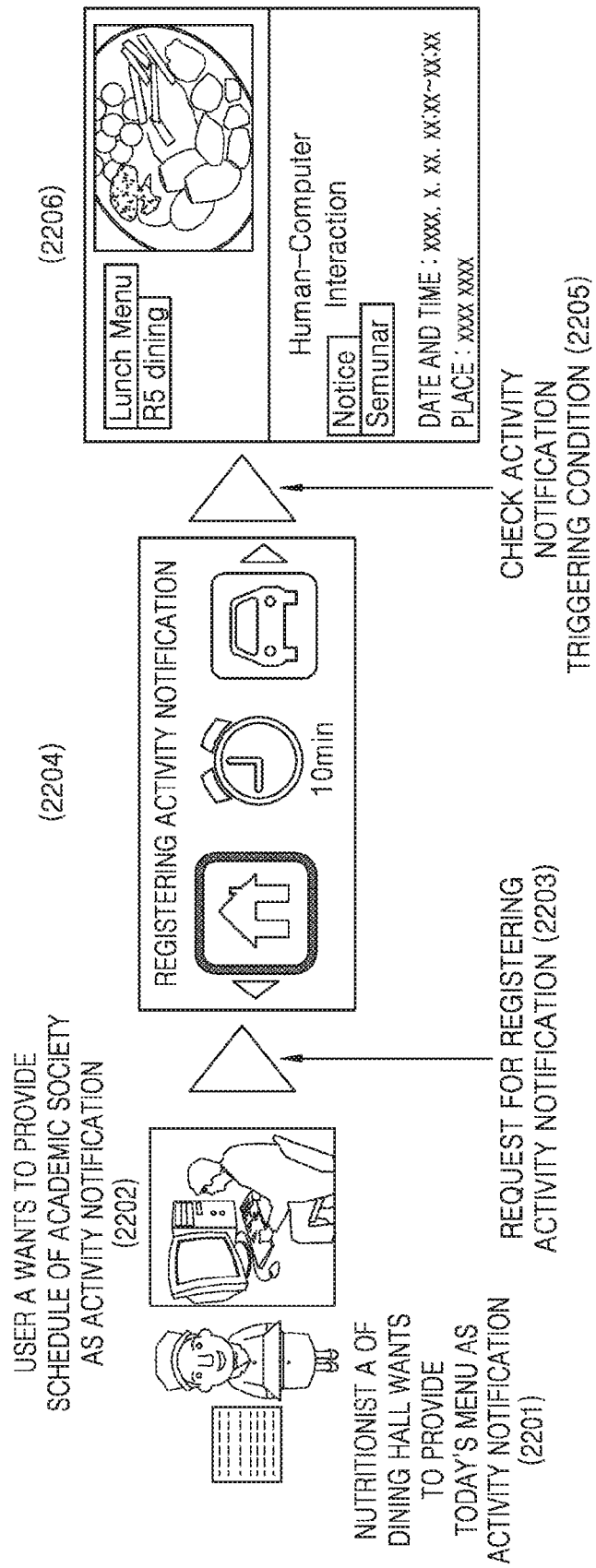

FIGS. 21 and 22 illustrate examples of providing an activity notification according to various embodiments of the present disclosure, by setting a management device as illustrated in Example 5 of FIG. 20.

Referring to FIG. 21, when user A having the first device 110 goes out and registers information about home, e.g., information about dinner, as information about an activity notification in operations 2101, 2102, and 2103, the server 130 performs at least a process of checking an activity notification triggering condition in operation 2104. Accordingly, the third through Nth devices 1910_3 to 1910_N designated by user A may trigger an activity notification in operation 2105. The user A may designate the third through Nth devices 1910_3 to 1910_N by using user information related to the third through Nth devices 1910_3 to 1910_N via the first device 110, but is not limited thereto. If user A designates one device, the designated device, e.g., the third device 1910_3, may trigger an activity notification.

FIG. 22 illustrates providing, according to an embodiment of the present disclosure, an activity notification where user A of the first device 110 is a nutritionist who works at a dining hall and a promoter of an academic society. When user A of the first device 110 is the nutritionist of the dining hall and registers information about an activity notification by using the first device 110 in order to provide people of Group 1 with today's menu via the activity notification in operations 2201, 2203, and 2204, the server 130 may perform at least a process of checking an activity notification triggering condition. When the people of Group 1, who are designated by user A, arrive at the dining hall, the third through Nth devices 1910_3 through 1910_N of the people of Group 1 may trigger the activity notification in operation 2206.

Also, when user A of the first device 110 is a promoter of an academic society and registers information about an activity notification by using the first device 110 in order to provide members with a schedule of the academic society via the activity notification in operations 2202, 2203, and 2204, the server 130 may perform at least a process of checking an activity notification triggering condition in operation 2205. When members who are designated by user A arrive at the place of the academic society, the third through Nth devices 1910_3 through 1910_N of the members may trigger the activity notification in operation 2206.

In the setup examples of management devices illustrated in FIG. 2 and FIG. 17 through FIG. 20, the management devices may be changed by the user of the management device set for each process. For example, when a user of a device that is to perform a process of triggering an activity notification designates another device as the management device of the process of triggering an activity notification, the management device set for the process of triggering an activity notification may be changed into the another device. If the management device set to at least one process of providing an activity notification is changed into another device and information about the registered activity notification is shared by a plurality of management devices, the plurality of management devices may update information about the registered activity notification so as to synchronize the information about the registered activity notification of the plurality of management devices.

Figure 23:
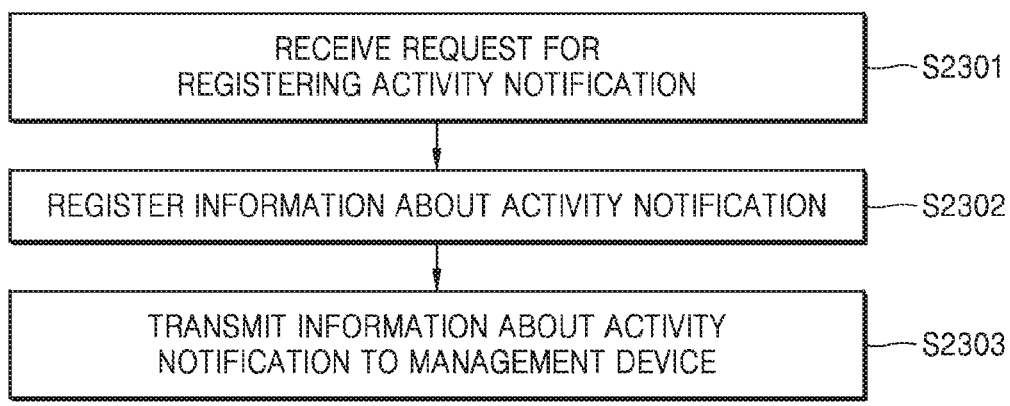
FIG. 23 is an operational flowchart of a method of providing an activity notification according to an embodiment of the present disclosure.

FIG. 23 is an operational flowchart of a method of providing an activity notification according to an embodiment of the present disclosure.

Referring to FIG. 23, although the method may be performed by the first device 110 or the server 130, for convenience of description, the method will be described below as being performed by the first device 110. However, the description below is not limited to the example where the method is performed by the first device 110.

Referring to FIG. 23, when a request for registering an activity notification is received in operation S2301, the first device 110 registers information about an activity notification in operation S2302. The request for registering an activity notification may be received based on one of the activity notification registration item 504 included in the menu items 503 illustrated in operation 501 and the activity notification registration item 506 included in the common area 505 illustrated on the screen 502 of FIG. 5A. For example, the first device 110 may receive a request for registering an activity notification based on a touch input with respect to the activity notification registration item 504 or the activity notification registration item 506.

As illustrated in FIG. 5C, from among user input information that may be input when an application or a service is executed by the first device 110, the first device 110 may recognize preset input information, e.g., input information indicating declining to receive a telephone call or input information indicating selection to receive a missed call, as a request for registering an activity notification.

In operation S2302, the first device 110 registers information about an activity notification. The registered information about the activity notification may include the activity information 301, the management device information for each process 302, the activity notification triggering condition information 303, and the additional information 304 described with reference to FIG. 3, but is not limited thereto.

When registering information about an activity notification in operation S2302, the first device 110 may set a management device with respect to a process performed to provide an activity notification. The process performed to provide an activity notification may include a process of registering an activity notification, a process of editing or canceling an activity notification, a process of checking an activity notification triggering condition, and a process of triggering an activity notification, but is not limited thereto. For example, a process of editing or canceling an activity notification may not be included in a process of providing an activity notification.

The first device 110 may set a management device based on at least one of information about a person, information about the first device 110, and information about at least one external device that is able to communicate with the first device 110, as described above with reference to FIG. 3. Referring to FIG. 1, at least one external device may include at least one of the second device 120 and the server 130. Referring to FIG. 19, at least one external device may include at least one of the second through Nth devices 120 and 1910_3 through 1910_N and the server 130.

The first device 110 transmits the information about the activity notification registered in operation S2303 to the management device. As illustrated in FIG. 2, FIG. 17, and FIG. 20, if a plurality of processes are performed to provide an activity notification and management devices set for respective processes are different, the first device 110 may transmit the information about the registered activity notification to each management device of each process in operation 2303.

As the information about the registered activity notification is transmitted, respective management devices of respective processes may share the information about an activity notification. The first device 110 may transmit the information about the registered activity notification to some of the management devices among the management devices of the processes. For example, the first device 110 may transmit the information about an activity notification to a management device set for a process of editing or canceling an activity notification and a process of checking an activity notification triggering condition.

If the first device 110 is included in management devices set for processes other than a process of registering an activity notification, the first device 110 may store pieces of information about an activity notification. The pieces of the information about an activity notification stored in the first device 110 may include information about an activity notification related to a process performed by the first device 110. For example, if the first device 110 is set as a management device related to a process of triggering an activity notification, pieces of information about an activity notification stored in the first device 110 may include the activity information 301 or the activity information 301 and the additional information 304, but is not limited thereto. If the first device 110 is set as a management device related to a process of checking an activity notification triggering condition, pieces of information about an activity notification stored in the first device 110 may include the activity notification triggering condition information 303 but is not limited thereto.

Figure 24:
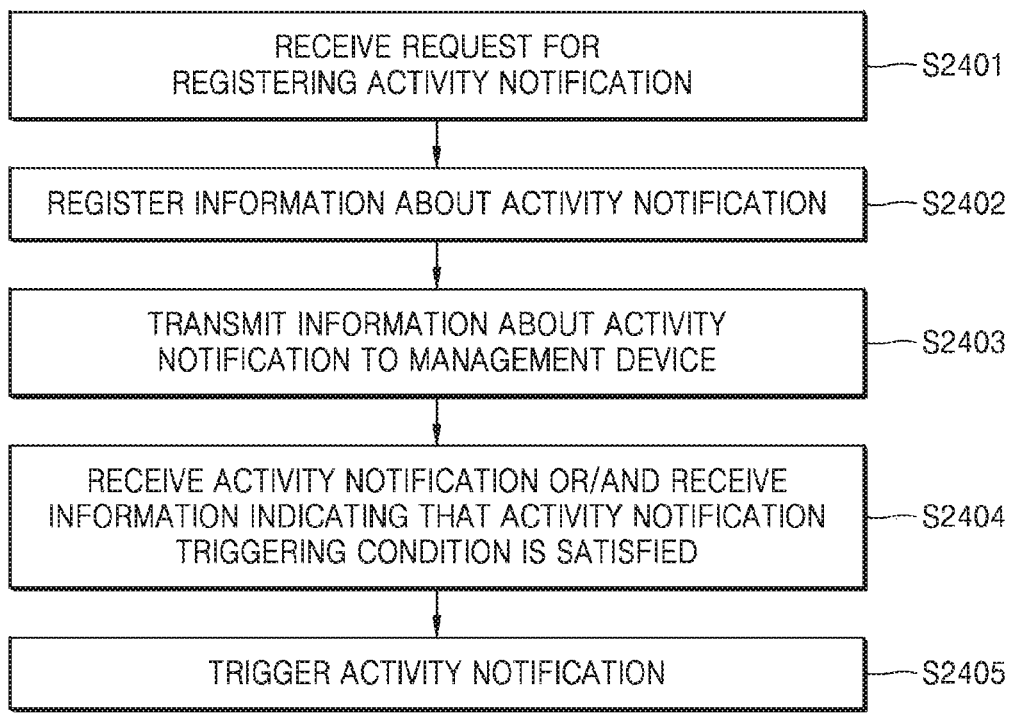
FIG. 24 is an operational flowchart of a method of providing an activity notification according to an embodiment of the present disclosure.

FIG. 24 is an operational flowchart of a method of providing an activity notification according to an embodiment of the present disclosure.

Referring to FIG. 24, the method corresponds to the method of FIG. 23, to which operations S2404 and S2405 are added, in which after the information about an activity notification is transmitted to the management device, an activity notification is triggered by the first device 110 as activity information and/or information indicating that an activity notification triggering condition is satisfied is received from a management device. Operations S2401 through S2403 of FIG. 24 may be performed similarly to operations S2301 through S2303 of FIG. 23. In operation S2405, an activity notification triggered by the first device 110 may include information whereby an activity may be executed.

Figure 25:
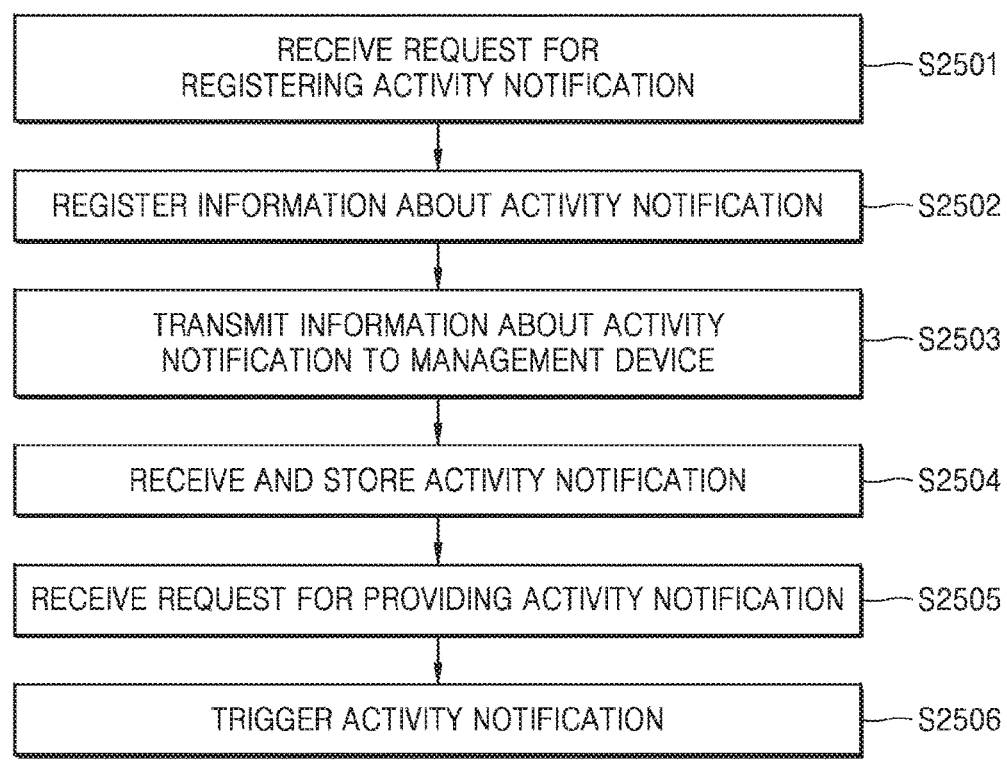
FIG. 25 is an operational flowchart of a method of providing an activity notification according to an embodiment of the present disclosure.

FIG. 25 is an operational flowchart of a method of providing an activity notification according to an embodiment of the present disclosure. The method of FIG. 25 corresponds to the method of FIG. 23, to which operations S2504, S2505, and S2506 are added, in which when an activity notification is received from at least one external device, the first device 110 stores the received activity notification in operation S2504, and when a request for providing an activity notification is received from the user of the first device 110 in operation S2505, the first device 110 triggers the activity notification in operation S2506. Operations S2501 through S2503 of FIG. 25 may be similarly performed as operations S2301 through S2303 of FIG. 23. In operation S2506, the activity notification triggered by the first device 110 may include information whereby an activity may be executed. In operation S2506, the first device 110 may re-trigger the activity notification, if a corresponding activity notification triggering condition is satisfied.

Figure 26:
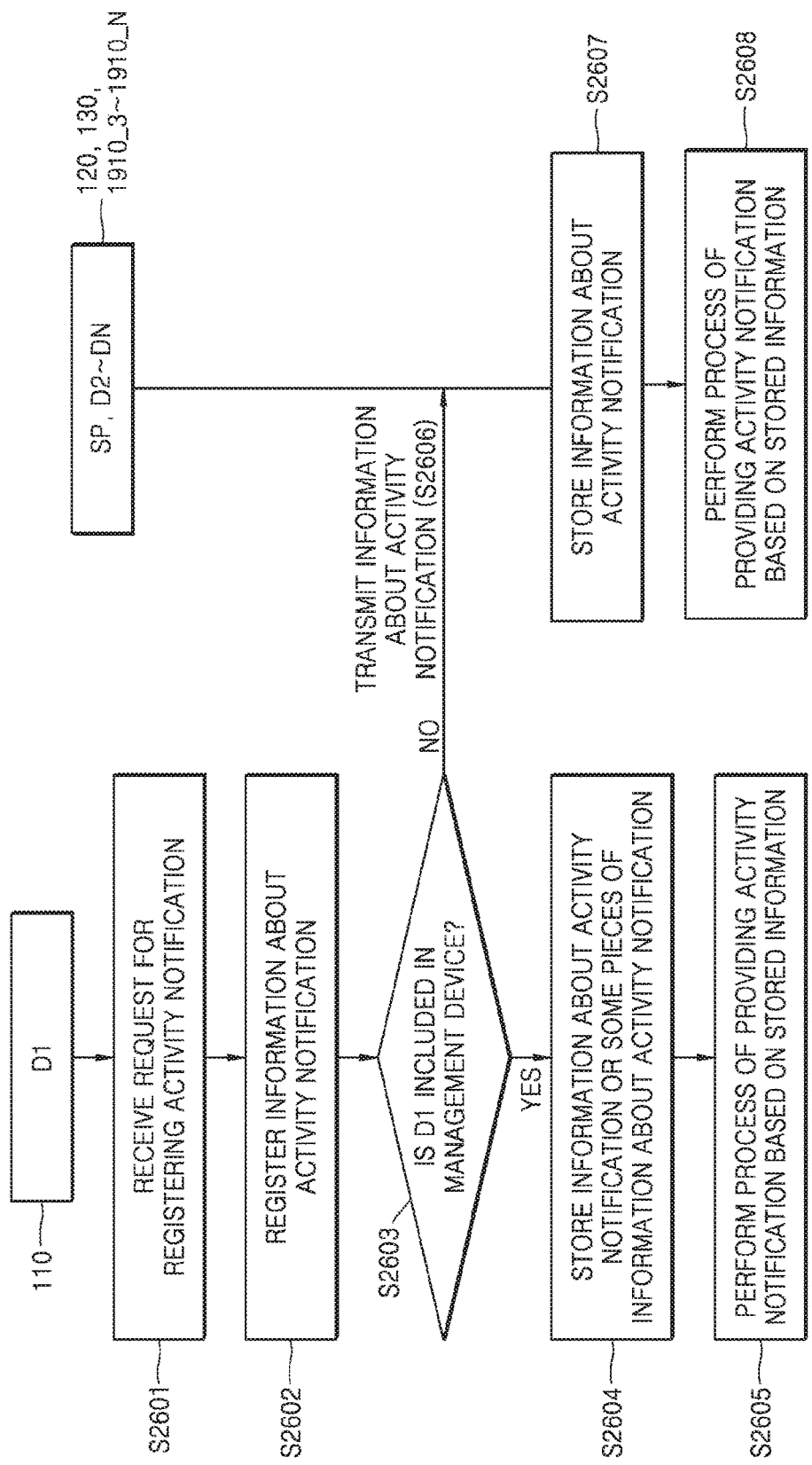
FIG. 26 is an operational flowchart of a method of providing an activity notification according to an embodiment of the present disclosure.

FIG. 26 is an operational flowchart of a method of providing an activity notification according to an embodiment of the present disclosure.

Referring to FIG. 26, the first device 110 may register information about an activity notification. When a request for registering an activity notification is received by the user of the first device 110 in operation S2601, the first device 110 registers information about an activity notification in operation S2602. In operation S2603, it is determined if the first device 110 is included in management devices included in the information about the registered activity notification, if yes, then the first device 110 stores pieces of the information about the registered activity notification or information about an activity notification in operation S2604. The management device included in the information about the registered activity notification may include management devices of processes except a process of registering an activity notification, but is not limited thereto. The first device 110 performs a process of providing an activity notification based on the stored information in operation S2605.

If the first device 110 is not included in the management devices included in the information about the registered activity notification, as determined in operation S2603, then the first device 110 transmits the information about the registered activity notification a device set as a management device, e.g., one of the server 130 and the second through Nth devices 120 and 1910_3 through 1910_N, in operation S2606. Accordingly, the device set as the management device, for example, the second device 120, stores the received information about the activity notification in operation S2607. The device set as the management device performs a process of providing an activity notification based on the stored information about the activity notification in operation S2608.

If the first device 110 and at least one device external to the first device 110 are included in the management devices included in the information about the activity notification registered in operation S2603, operations S2606 and S2608 may be performed while operations S2604 and S2605 are performed.

Figure 27:
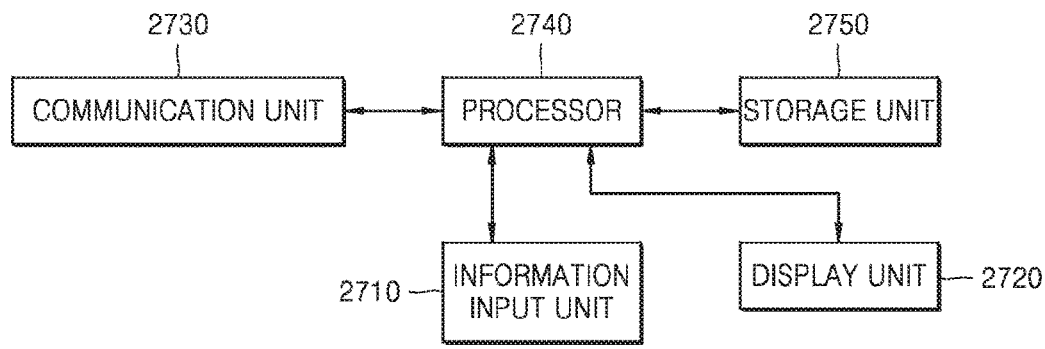
FIGS. 27 and 28 are structural diagrams of a device according to various embodiments of the present disclosure.
Figure 28:
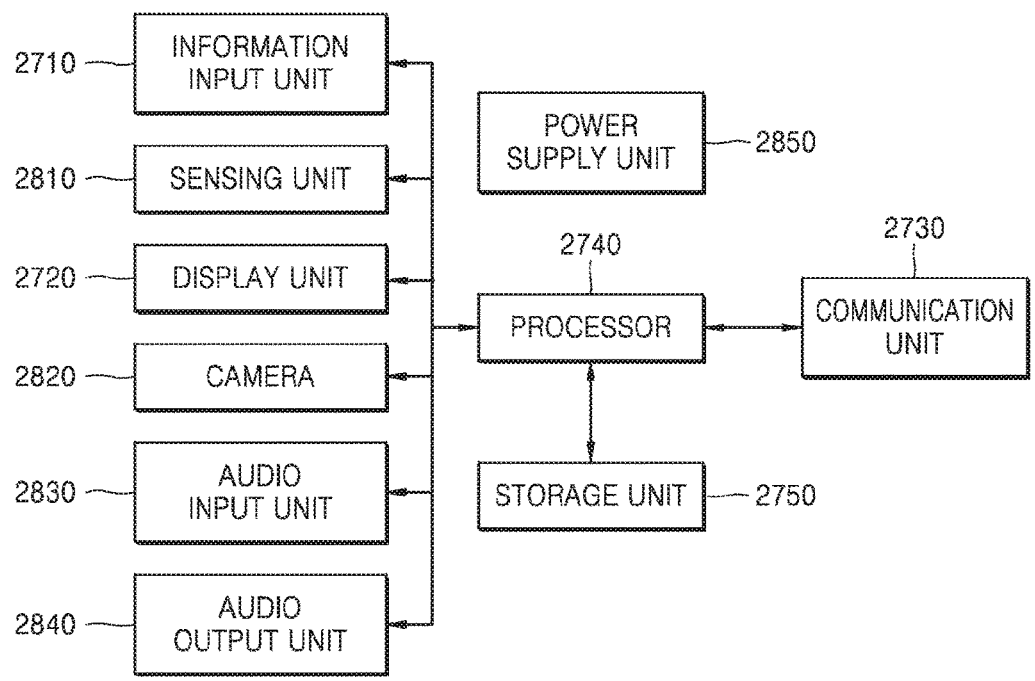

FIGS. 27 and 28 are functional block diagrams of the first device 110 according to various embodiments of the present disclosure.

Referring to FIG. 27, the first device 110 may include an information input unit 2710, a display unit 2720, a communication unit 2730, a processor 2740, and a storage unit 2750. However, not all of the illustrated elements are essential elements. The first device 110 may be implemented by more elements or less elements than those illustrated.

For example, the first device 110, according to an embodiment of the present disclosure, may further include, as illustrated in FIG. 28, a sensing unit 2810, a camera 2820, an audio input unit 2830, an audio output unit 2840, and a power supply unit 2850. The camera 2820 and the audio input unit 2830 illustrated in FIG. 28 may be referred to as an audio/video (AV) input module or an input module. The display unit 2720 and the audio output unit 2840 illustrated in FIG. 28 may be referred to as an AV output module or an output module.

A user may input information about a request for registering an activity notification or information about an activity notification via the information input unit 2710. The information about a request for registering an activity notification or information about an activity notification may be input based on a user interface based on a framework of an activity notification as described above with reference to FIG. 5A, FIG. 5B, and FIG. 5C.

The information input unit 2710 may be mounted in the first device 110 and used by the user to input data used to control the first device 110. Due to this data inputting function, the information input unit 2710 may be referred to as a user input unit. For example, at least one of a key pad, a dome switch, a touch pad, e.g., capacitive overlay, resistive overlay, infrared beam, surface acoustic wave, integral strain gauge, and piezoelectric type touch pads, a jog wheel, and a jog switch may be mounted as the information input unit 2710 in the first device 110, but is not limited thereto.

User input information that may be input via the information input unit 2710 may include touch-based input information. Touch-based input information may include gesture-based input information. For example, at least one of a tab or touch, a long tab or long touch, a touch and hold, a touch and drag, a double tab, a drag, panning, a flick, a drag and drop, and a sweep may be included as touch-based input information, but the touch-based input information is not limited thereto.

User input information may include movement-based input information or vision-based input information. Movement-based input information may be based on a gesture of a user based on movement of a device, e.g., shaking a device, rotating a device, and lifting a device. Vision-based input information may be based on information that is recognized by analyzing an input image obtained by using a camera without contacting a device.

The display unit 2720 may be configured such that information processed by the first device 110 is displayed. The display unit 2720 may display a screen for providing an activity notification as illustrated in FIG. 4 through FIG. 16, FIG. 21, and FIG. 22. The display unit 2720 may display information based on a user interface via which a request for registering an activity notification and information about an activity notification may be input.

When a touch pad is configured as a touch screen based on a layered structure, the display unit 2720 may also be used as an input device in addition to an output device. The display unit 2720 may include at least one of a liquid crystal display (LCD), a thin film transistor LCD (TFT-LCD), an organic light-emitting diode (OLED), a flexible display, a three-dimensional (3D) display, and an electrophoretic display (EPD). According to its implementation form, the first device 110 may include at least two display units 2720. The at least two display units 2720 may be disposed to face each other by using a hinge.

The communication unit 2730 may include at least one component that allow communication between the first device 110 and at least one external device, e.g., the second device 120, or communication between the first device 110 and the server 130. For example, the communication unit 2730 may include at least one of a short range communication device, a mobile communication device, and a broadcast receiver.

A short-range wireless communicator may include at least one of a Bluetooth communication unit, a BLE communication unit, an NFC unit, a WLAN communication unit, a Zigbee communication unit, an IrDA communication unit, a WFD communication unit, a UWB communication unit, or an Ant+ communication unit, but is not limited thereto.

A mobile communication device transmits or receives a wireless signal to and from at least one of a base station, an external device, and the server 130 on a mobile communication network. A wireless signal may include a voice call signal, a video call signal, or various types of data according to transmission or reception of short or multimedia message.

A broadcast receiver receives a broadcasting signal and/or information related to broadcasting from the outside via a broadcasting channel. A broadcasting channel may include a satellite channel, a terrestrial channel, or a radio channel.

The communication unit 2730 may transmit information about an activity notification to an external device, according to an embodiment of the present disclosure. The transmitted information about an activity notification may have a structure as illustrated in FIG. 3, but is not limited thereto. The information about an activity notification, transmitted to the external device may be referred to as an activity notification message.

The storage unit 2750 may store a program for processing or controlling of the processor 2740. A program stored in the storage unit 2750 may include a program for providing an activity notification according to an embodiment of the present disclosure. The storage unit 2750 stores information about an activity notification input via the information input unit 2710. The information about an activity notification stored in the storage unit 2750 may be configured as illustrated in FIG. 3, but is not limited thereto.

The storage unit 2750 may include at least one type of storage medium selected from a flash memory type, a hard disk type, a multimedia card micro type, a card type memory, e.g., secure digital (SD) or extreme digital (XD) memory, a random access memory (RAM), a static RAM, a read-only memory (ROM), an electrically erasable programmable ROM (EEPROM), a PROM, a magnetic memory, a magnetic disk, and an optical disk.

The first device 110 may be configured to use a web storage or a cloud server that performs a storage function of the storage unit 2750 on the Internet. In this case, information about a user interface such as registering of an activity notification, displayed on the display unit 2720, may be provided from the web storage or the cloud server described above.

Programs stored in the storage unit 2750 may be classified as a plurality of modules according to functions of the programs. For example, the programs may be classified as a UI module, a notification module, and an application module, but are not limited thereto. For example, if the display unit 2720 is combined with a touch panel layer, the plurality of modules may include a touch screen module.

A UI module may provide the processor 2740 with UI information about a request for registering an activity notification and registering an activity notification described above with reference to the various embodiments of the present disclosure. The UI module may provide the processor 2740 with a UI, a GUI, or the like, that are specialized with respect to each application installed in the first device 110.

A notification module may generate a signal for notifying an event of the first device 110. Examples of an event generated by the first device 110 may include power on and off of the first device 110, receiving of an activity notification, receiving a signal indicating that a condition for triggering an activity notification is satisfied, receiving information about an activity notification, and completion of registration of an activity notification, but are not limited thereto.

The notification module may output a notification signal in the form of a video signal via the display unit 2720 or in the form of an audio signal via the audio output unit 2840, but is not limited thereto.

An application module may include various applications set in the first device 110. A method of providing an activity notification according to various embodiments of the present disclosure may be provided via the various applications set in the first device 110.

The processor 2740 controls an overall operation of the first device 110. Thus, the processor 2740 may be referred to as a controller. For example, in the case of FIG. 27, the processor 2740 may control the information input unit 2710, the display unit 2720, the communication unit 2730, and the storage unit 2750, by executing programs stored in the storage unit 2750. In the case of FIG. 28, the processor 2740 may control the information input unit 2710, the display unit 2720, the communication unit 2730, the sensing unit 2810, the camera 2820, the audio input unit 2830, the audio output unit 2840, and the power supply unit 2850, by executing the programs stored in the storage unit 2750.

When registration of an activity notification is requested based on the activity notification registration items 504 and 506 illustrated on the screens 501 and 502 of FIG. 5A displayed on the display unit 2720, the processor 2740 displays user interface information for registering an activity notification on the display unit 2720 as illustrated in FIG. 5B. When information about an activity notification is received based on user interface information for registering an activity notification displayed on the display unit 2720, the processor 2740 stores the received information about the activity notification to the storage unit 2750.

When a process of registering information about an activity notification is completed, the processor 2740 may transmit information about the registered activity notification to at least one external device or a server via the communication unit 2730 based on information about a management device included in information about the registered activity notification.

The processor 2740 may perform a process of providing an activity notification according to one of the operational flowcharts illustrated in FIG. 23 through FIG. 26. The processor 2740 may include a plurality of processors according to an operational environment of the first device 110. For example, the processor 2740 may include a processor operating in a low-power mode of the first device 110 and a processor operating in a normal mode of the first device 110. The processor 2740 may include a plurality of processors distinguished according to components included in the first device 110.

The sensing unit 2810 may include at least one of a sensor sensing whether a user has approached the first device 110, a sensor sensing illumination around the first device 110, a sensor sensing a voice of a user of the first device 110, and a sensor sensing a mood or activity of the user of the first device 110, but is not limited thereto. That is, the sensing unit 2810 may include a plurality of sensors to sense the context described earlier above. A result of sensing by the sensing unit 2810 may be transmitted to the processor 2740.

The sensing unit 2810 may be configured such that a mood and/or activity of a user is sensed by using an external device connected to the sensing unit 2810, and a result of such sensing is transmitted to the processor 2740. According to a result of sensing of the sensing unit 2810, the processor 2740 may determine whether an activity notification triggering condition is satisfied. For example, if it is determined that the user of the first device 110 is near home as a result of sensing of the sensing unit 2810, the processor 2740 may perform a process of triggering an activity notification. An external device connected to the sensing unit 2810 may include a measurement device that may monitor a mood and/or activity of a user.

The camera 2820 may obtain an image frame, such as a still image or a video via an image sensor in a video call mode or a photographing mode. The camera 2820 may obtain a finger gesture image of the user of the first device 110 and transmit the same to the processor 2740. The processor 2740 may use the finger gesture image of the user described above to determine whether a request for registering an activity notification is received or to determine whether registration of an activity notification is completed, but is not limited thereto. An image captured by using the image sensor may be processed via the processor 2740 or an additional image processor (not shown).

An image frame processed by the camera 2820 may be stored in the storage unit 2750 or transmitted to the outside via the communication unit 2730. The first device 110 may include at least two cameras according to a configuration aspect of the first device 110.

The audio input unit 2830 receives an audio signal from the outside of the first device 110 and converts the received audio signal into an electrical audio signal and transmits the same to the processor 2740. The audio input unit 2830 may be formed of a microphone. An audio signal received from the outside may include a sound signal of an external device connected to the first device 110 or a user around the first device 110. The audio input unit 2830 may use various noise removing algorithms to remove noise generated when receiving an external sound signal.

The audio output unit 2840 outputs audio data received from the communication unit 2730 or audio data stored in the storage unit 2750. Also, the audio output unit 2840 may output a sound signal related to a function performed by the first device 110, e.g., a notification sound. The audio output unit 2840 may include, for example, a speaker or a buzzer.

The power supply unit 2850 supplies power to the first device 110. According to an embodiment of the present disclosure, the first device 110 may be excluded from the power supply unit 2850, and the first device 110 may be configured to include a connector (not shown) that is connectable to an external power supply unit (not shown).

The second device 120 illustrated in FIG. 1 and FIG. 19, and the third through Nth devices 1910_3 through 1910_N illustrated in FIG. 19, may be configured like the first device 110 illustrated in FIG. 27 and FIG. 28, but are not limited thereto. The server 130 illustrated in FIG. 1 and FIG. 19 may also be configured like the first device 110 illustrated in FIG. 27 and FIG. 28, but is not limited thereto.

The various embodiments of the present disclosure can be implemented as program instructions that can be executed using various computer components and can be written to a computer readable recording medium. The computer readable recording medium may include program instructions, a data file, a data structure etc. alone or in combination. The program instructions written to the computer readable recording medium may be specifically designed and configured for the various embodiments of the present disclosure or may be well-known and available to one of ordinary skill in the art. Examples of the computer readable recording medium include magnetic storage media, e.g., hard disks, floppy disks, magnetic tapes, etc., optical recording media, e.g., compact disc ROMs (CD-ROMs), or digital versatile discs (DVDs), magneto-optical media, e.g., floptical disks, and hardware devices specifically configured to store and execute program instructions, e.g., ROM, RAM, flash memories, etc. Examples of the program instructions include not only machine codes generated by using a compiler but also high-level language codes that can be executed on a computer by using an interpreter or the like.

It should be understood that the various embodiments of the present disclosure described herein should be considered in a descriptive sense only and not for purposes of limitation. Descriptions of features or aspects within each embodiment of the present disclosure should typically be considered as available for other similar features or aspects in other embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for providing notifications, comprising:
    a memory storing instructions for a first program for browsing internet content and a second program for providing notifications; and
    a processor configured to execute the instructions to at least:
        provide, using the first program, internet content corresponding to uniform resource locator (URL) information;

provide, using the first program, a first user interface object for notification registration relating to the internet content, while providing the internet content;

based at least on a user input to the first user interface object, obtain, using the second program, the URL information of the internet content;

obtain, using the second program, at least time-related information as a notification-triggering condition;

based at least on the notification-triggering condition, provide, using the second program, a notification including the URL information and a second user interface object for executing the first program on the display of the electronic device at a time corresponding to the time-related information; and in response to user input to the second user interface object, provide, using the first program, the internet content corresponding to the URL information.

2. The electronic device according to claim 1, configured as a notebook computer.

3. The electronic device according to claim 1, configured as a smartphone.

4. The electronic device according to claim 1, wherein the time-related information comprises a date and a time.

5. The electronic device according to claim 1, wherein the notification-triggering condition further comprises location-related information.

6. The electronic device according to claim 5, wherein the notification is provided at the time corresponding to the time-related information or when a location of the electronic device corresponds to the location-related information.

7. The electronic device according to claim 1, wherein the time-related information is obtained based on audio information.

8. The electronic device according to claim 1, wherein the time-related information is obtained based on input to a touchscreen display of the electronic device.

9. The electronic device according to claim 1, wherein the processor is configured to execute the instructions to send the URL information and the notification-triggering condition to a management server such that the URL information is provided as a notification at another electronic device, which accesses the management server, at the time corresponding to the time-related information.

10. A method for providing notifications using an electronic device, the method comprising:

providing, using a first program, internet content corresponding to uniform resource locator (URL) information;

providing, using the first program, a first user interface object for notification registration relating to the internet content while providing the internet content;

based at least on a user input to the first user interface object, obtaining, using a second program, the URL information of the internet content;

obtaining, using the second program, at least time-related information as a notification-triggering condition;

based at least on the notification-triggering condition, providing, using the second program, a notification including the URL information and a second user interface object for executing the first program on the display of the electronic device at a time corresponding to the time-related information; and in response to user input to the second user interface object, providing, using the first program, the internet content corresponding to the URL information.

11. The method according to claim 10, wherein the electronic device comprises a notebook computer.

12. The method according to claim 10, wherein the electronic device comprises a smartphone.

13. The method according to claim 10, wherein the time-related information comprises a date and a time.

14. The method according to claim 10, wherein the notification-triggering condition further comprises location-related information.

15. The method according to claim 14, wherein the notification is provided at the time corresponding to the time-related information or when a location of the electronic device corresponds to the location-related information.

16. The method according to claim 10, wherein the time-related information is obtained based on audio information.

17. The method according to claim 10, wherein the time-related information is obtained based on input to a touchscreen display of the electronic device.

18. The method according to claim 10, further comprising:

sending the URL information and the notification-triggering condition to a management server such that the URL information is provided as a notification at another electronic device, which accesses the management server, at the time corresponding to the time-related information.

19. A non-transitory computer-readable medium storing instructions for a first program for browsing internet content and a second program for providing notifications, the instructions, when executed by a processor of an electronic device, causing the electronic device to at least:

provide, using the first program, internet content corresponding to uniform resource locator (URL) information, provide, using the first program, a first user interface object for notification registration relating to the internet content while providing the internet content, based at least on a user input to the first user interface object, obtain, using the second program, the URL information of the internet content, obtain, using the second program, at least time-related information as a notification-triggering condition, based at least on the notification-triggering condition, provide, using the second program, a notification including the URL information and a second user interface object for executing the first program on the display of the electronic device at a time corresponding to the time-related information, and in response to user input to the second user interface object, provide, using the first program, the internet content corresponding to the URL information.

20. An electronic device comprising a processor operatively coupled to the non-transitory computer-readable medium of claim 19.

* * * * *